(12) United States Patent
Chen et al.

(10) Patent No.: US 10,135,852 B2
(45) Date of Patent: Nov. 20, 2018

(54) BOT DETECTION BASED ON BEHAVIOR ANALYTICS

(71) Applicant: CA, INC., New York, NY (US)

(72) Inventors: Zheng Chen, Philadelphia, PA (US); Chi Zhang, Catonsville, MD (US); Jin Zhang, Palo Alto, CA (US)

(73) Assignee: CA, Inc., New York, NY (US)

( * ) Notice: Subject to any disclaimer, the term of this patent is extended or adjusted under 35 U.S.C. 154(b) by 136 days.

(21) Appl. No.: 15/261,465

(22) Filed: Sep. 9, 2016

(65) Prior Publication Data

US 2018/0077181 A1    Mar. 15, 2018

(51) Int. Cl.
*H04L 29/06*    (2006.01)

(52) U.S. Cl.
CPC ...... *H04L 63/1425* (2013.01); *H04L 63/1441* (2013.01); *H04L 2463/144* (2013.01)

(58) Field of Classification Search
CPC ............ H04L 63/1425; H04L 63/1441; H04L 2463/144
See application file for complete search history.

(56) References Cited

U.S. PATENT DOCUMENTS

| | | | |
|---|---|---|---|
| 8,307,459 B2 | 11/2012 | Lee | |
| 9,049,221 B1 * | 6/2015 | Yen | H04L 63/1408 |
| 9,294,486 B1 * | 3/2016 | Chiang | H04L 63/14 |
| 2010/0037314 A1 * | 2/2010 | Perdisci | H04L 63/1416 726/22 |
| 2011/0004936 A1 | 1/2011 | Lee | |
| 2011/0208714 A1 * | 8/2011 | Soukal | G06F 17/30864 707/709 |
| 2012/0054869 A1 * | 3/2012 | Yen | H04L 29/12066 726/24 |
| 2012/0090030 A1 * | 4/2012 | Rapaport | H04L 63/1441 726/23 |
| 2012/0278889 A1 * | 11/2012 | El-Moussa | H04L 63/1425 726/23 |
| 2013/0198203 A1 * | 8/2013 | Bates | G06F 17/30861 707/748 |
| 2014/0090059 A1 * | 3/2014 | Wang | H04L 63/1416 726/23 |
| 2015/0264068 A1 * | 9/2015 | Beauchesne | H04L 63/1416 726/23 |
| 2015/0326600 A1 | 11/2015 | Karabatis | |
| 2016/0156644 A1 * | 6/2016 | Wang | H04L 63/1416 726/23 |

OTHER PUBLICATIONS

Carter, et al., "Probabilistic Reasoning for Streaming Anomaly Detection," Statistical Signal Processing Workshop, Aug. 2012.
Kang, et al., "Large-scale Bot Detection for Search Engines," Proceedings of the 19th International Conference on World Wide Web, Jan. 2010.
Manasrah, et al., "Detecting Botnet Activities Based on Abnormal DNS traffic," International Journal of Computer Science and Information Security, Nov. 2009.

(Continued)

*Primary Examiner* — Yonas A Bayou
(74) *Attorney, Agent, or Firm* — Vierra Magen Marcus LLP

(57) ABSTRACT

A system automatically detects bots and/or botnets.

20 Claims, 25 Drawing Sheets

(56) References Cited

OTHER PUBLICATIONS

Tegeler, et al., "BotFinder: Finding Bots in Network Traffic Without Deep Packet Inspection," Proceedings of the 8th international conference on Emerging networking experiments and technologies, Dec. 2012.
Thomas, et al., "The Koobface Botnet and the Rise of Social Malware," Proceedings of the 5th IEEE International Conference on Malicious and Unwanted Software, Oct. 2010.
Yu, et al., "SBotMiner: Large Scale Search Bot Detection," Proceedings of the third ACM international conference on Web search and data mining, Jan. 2010.
Zhao et al. "BotGraph: Large Scale Spamming Botnet Detection," Proceedings of the 6th USENIX Symposium on Networked Systems Design and Implementation, Apr. 2009.
Simard, et al., "Best Practices for Convolutional Neural Networks Applied to Visual Document Analysis," Proceedings of the Seventh International Conference on Document Analysis and Recognition, Aug. 2003.
Springenberg, et al., "Striving for Simplicity: The All Convolutional Net," ICLR 2015.
Wan, et al., "Regularization of Neural Networks using DropConnect," Proceedings of the 30th International Conference on Machine Learning, Atlanta, Georgia, USA, 2013.
Liang, et al., "Recurrent convolutional neural network for object recognition," Computer Vision and Pattern Recognition (CVPR), 2015 IEEE Conference, Jun. 2015.
Akiyama, et al., "A Proposal of Metrics for Botnet Detection Based on Its Cooperative Behavior," International Symposium on Applications and the Internet Workshops, Jan. 2007.
Strayer, et al., "Botnet Detection Based on Network Behavior," Botnet Detection, vol. 36 of the series Advances in Information Security, pp. 1-24, 2008.

\* cited by examiner

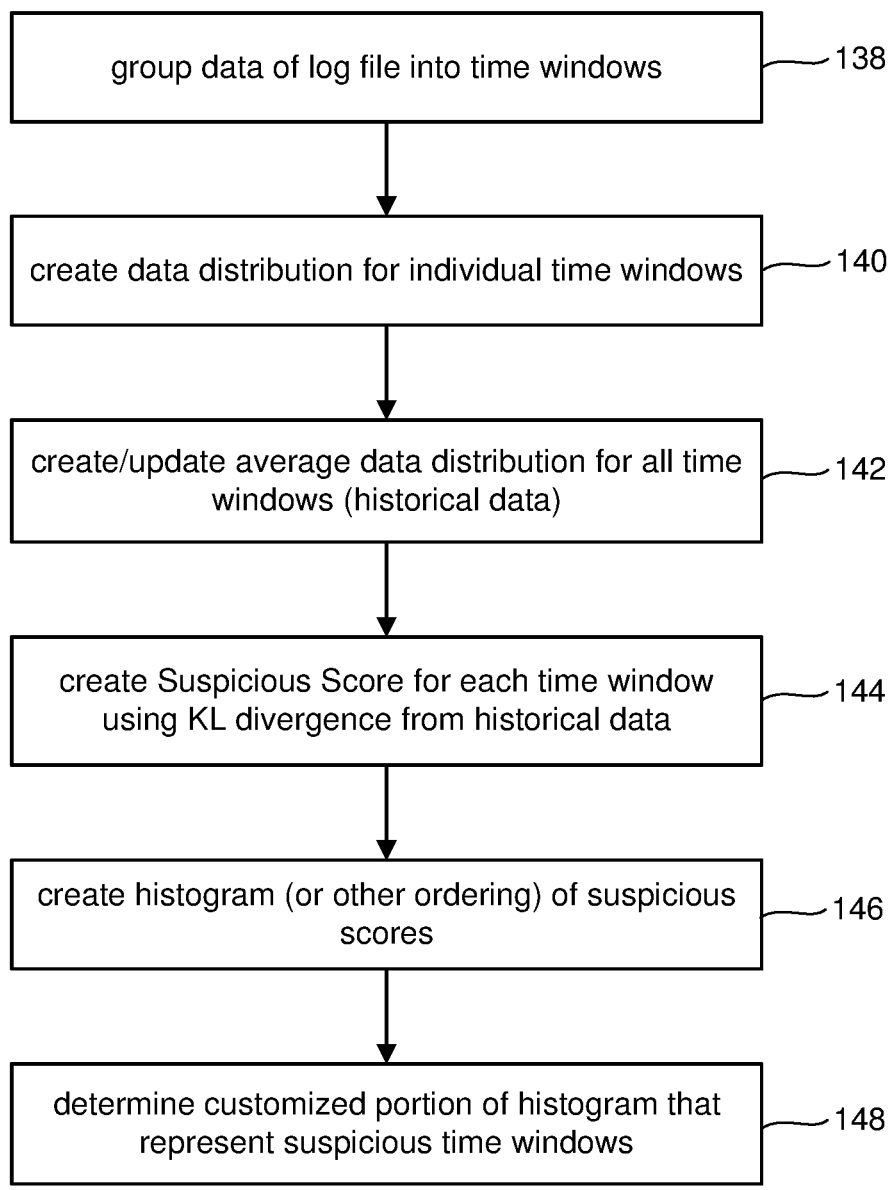

IP $$\text{Request} \begin{pmatrix} 12 & 5 & 1 & 5 & 1 & 0 \\ 10 & 5 & 0 & 1 & 2 & 1 \\ 22 & 5 & 0 & 0 & 4 & 2 \\ 19 & 4 & 3 & 3 & 1 & 1 \\ 16 & 0 & 4 & 2 & 1 & 0 \\ 12 & 15 & 1 & 4 & 0 & 2 \\ 7 & 21 & 0 & 2 & 0 & 2 \\ 1 & 11 & 0 & 0 & 4 & 4 \\ 2 & 21 & 2 & 1 & 0 & 0 \\ 2 & 14 & 1 & 1 & 4 & 4 \end{pmatrix}$$

Bot A  Bot B

Figure 7A

Example request matrix for single bots

IP $$\text{Request} \begin{pmatrix} 1 & 0 & 1 & 7 & 1 & 2 \\ 1 & 0 & 1 & 6 & 1 & 1 \\ 3 & 0 & 4 & 0 & 3 & 3 \\ 6 & 0 & 2 & 1 & 5 & 5 \\ 1 & 1 & 0 & 6 & 1 & 1 \\ 2 & 0 & 0 & 5 & 2 & 2 \\ 9 & 1 & 0 & 1 & 8 & 7 \\ 4 & 0 & 0 & 1 & 4 & 4 \\ 0 & 0 & 1 & 5 & 0 & 0 \\ 7 & 4 & 1 & 1 & 7 & 7 \end{pmatrix}$$

← Botnet →

Figure 7B

Example request matrix for a botnet

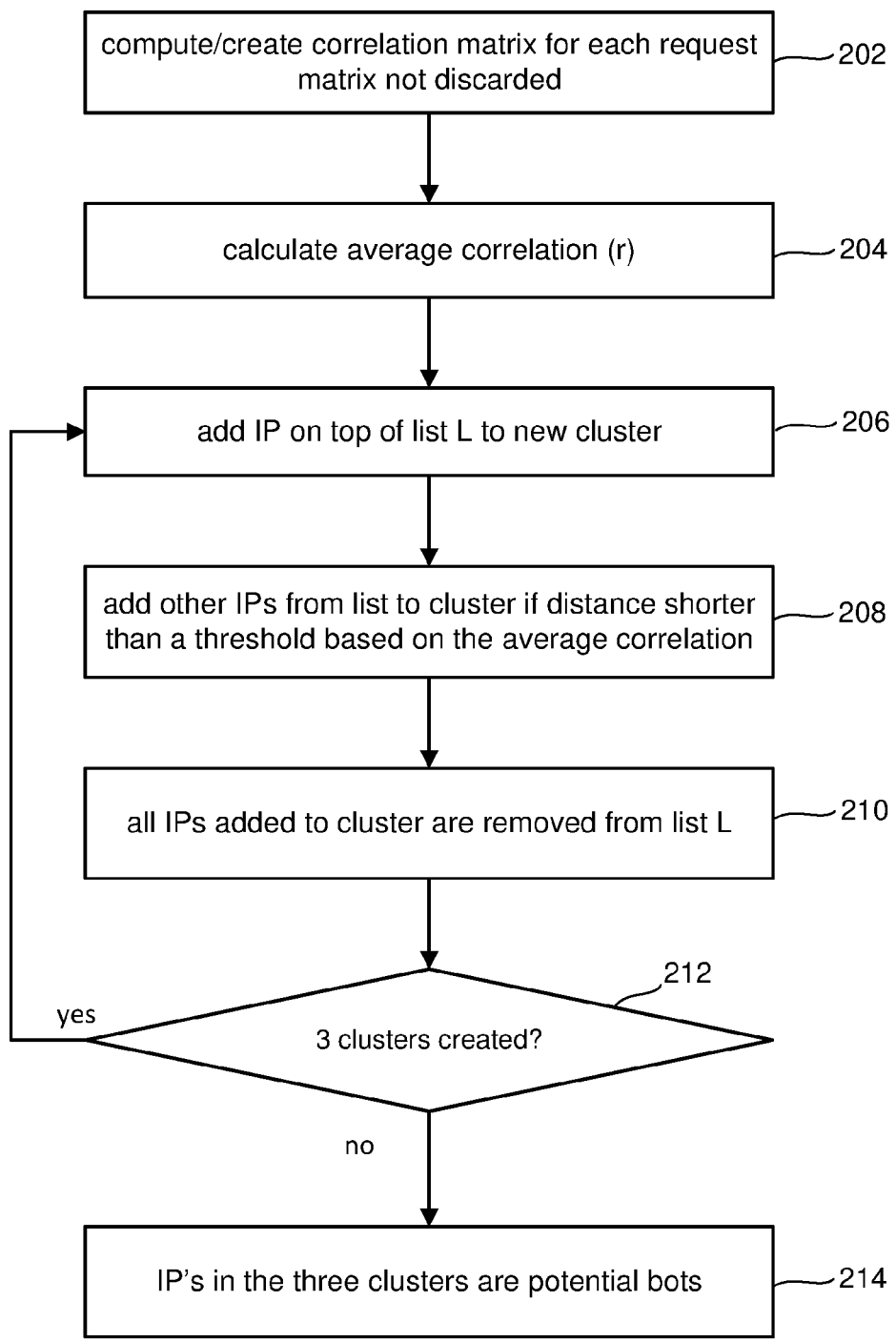

Figure 9A $$\begin{pmatrix} 1 & -0.68 & 0.30 & 0.27 & -0.07 & -0.42 \\ & 1 & -0.36 & -0.12 & -0.29 & 0.29 \\ & & 1 & 0.30 & -0.39 & -0.54 \\ & & & 1 & -0.64 & -0.46 \\ & & & & 1 & 0.68 \\ & & & & & 1 \end{pmatrix}$$

Correlation matrix of single bots

Figure 9B $$\begin{pmatrix} 1 & 0.51 & -0.03 & -0.77 & \boxed{0.99} & 0.98 \\ & 1 & -0.14 & -0.29 & 0.57 & 0.59 \\ & & 1 & -0.39 & -0.03 & 0.03 \\ & & & 1 & -0.79 & -0.77 \\ & & & & 1 & 0.99 \\ & & & & & 1 \end{pmatrix}$$

Correlation matrix of a botnet

Define: oddness = $1 - \dfrac{\text{probability}}{\text{max probability in a distribution}}$ oddness of visiting "/addcart" after "/product/A":
$$1 - \frac{0.3}{0.5} = 0.4$$

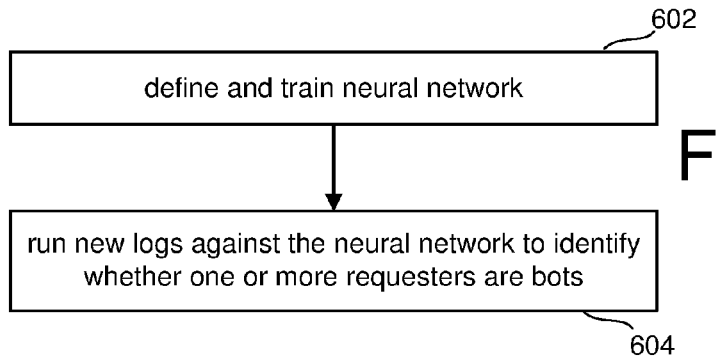
Figure 20
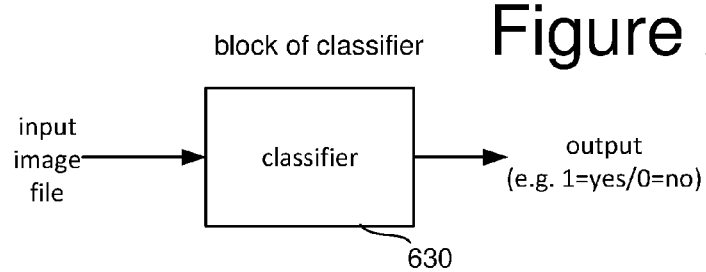
Figure 21
Figure 22
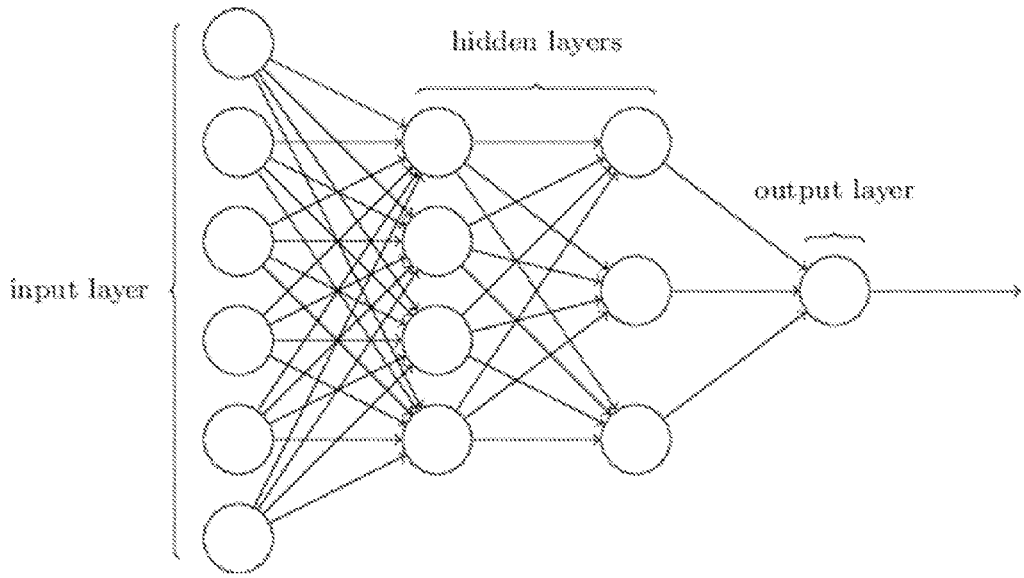

104.131.188.82 - - [26/Apr/2016:05:22:02 +0000] "GET /robots.txt HTTP/1.1" 200 6095 "-" "Mozilla/5.0 (compatible; spbot/5.0.1; +http://OpenLinkProfiler.org/bot )"

Figure 27

```
104.131.188.82 - - [26/Apr/2016:05:22:02 +0000]GET

/robots.txt 1.1 200 6095

Mozilla/5.0 (compatible; spbot/5.0.1; +http://OpenLinkProfiler.org/bot
```

Figure 28

```
104.131.188.82 - - [26/apr/2016:05:22:02 +0000]get

/robots.txt 1.1 200 6095 mozilla/5.0 (compatible; spbot/5.0.1; +http://openlinkprofiler.org/bot
```

Figure 29

| 49 | 48 | 52 | 46 | 49 | 51 | 49 | 46 | 49 | ... |
| 50 | 43 | 48 | 48 | 58 | 48 | 48 | 103 | 101 | ... |
| 32 | 32 | 32 | 32 | 32 | 32 | 32 | 32 | 32 | ... |
| 32 | 32 | 32 | 32 | 32 | 32 | 32 | 32 | 32 | ... |
| 32 | 32 | 32 | 32 | 32 | 32 | 32 | 32 | 32 | ... |
| ... | | | | | | | | | |

BOT DETECTION BASED ON BEHAVIOR ANALYTICS

BACKGROUND

A bot is a software application that runs automated tasks (e.g., scripts) over the Internet. Bots perform malicious tasks like skewing website statistics, price scraping, spam distribution, DOS attack, etc. Single bots usually request network resources at a much higher rate than human users, which can effect load on the server and response times for human users.

A botnet is a group of computers connected in a coordinated fashion. Individual computers of a large-scale botnet might request resources at a human-like speed, but together they place a heavy load on the servers and, therefore, can cause a server to go down.

BRIEF SUMMARY

According to one aspect of the present disclosure, a system is disclosed that automatically detects bots accessing network resources (e.g., one or more web pages).

One embodiment includes constructing a representation of historical request sequences that includes network resources, transitions between network resources and criteria for multiple scores for each transition related to performance of the transition. For a new visit to a network resource comprising a new transition, the method further comprises evaluating criteria for multiple scores for the new transitions based on the representation of historical request sequences to compute a visit score for the new visit. The system determines if the new visit is from a bot based on the visit score.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

FIG. 4 is a flow chart describing one embodiment of a process for finding suspicious time windows.

FIG. 7A is an example request matrix.

FIG. 7B is an example request matrix.

FIG. 8 is a flow chart describing one embodiment of a process for clustering.

FIG. 9A is an example correlation matrix.

FIG. 9B is an example correlation matrix.

FIG. 20 is a flow chart describing one embodiment of a process for detecting bots using deep learning and neural networks.

FIG. 21 is a block diagram of a classifier.

FIG. 22 is a block diagram of a neural network.

FIG. 27 depicts input text that has been padded with blank spaces.

FIG. 28 depicts input text that has been converted to lower case.

FIG. 29 depicts input text convert to ASCII numbers.

FIG. 30 depicts input text converted to categorical form as base 2 digits occupying a constant number of bits.

DETAILED DESCRIPTION

Figure 1:
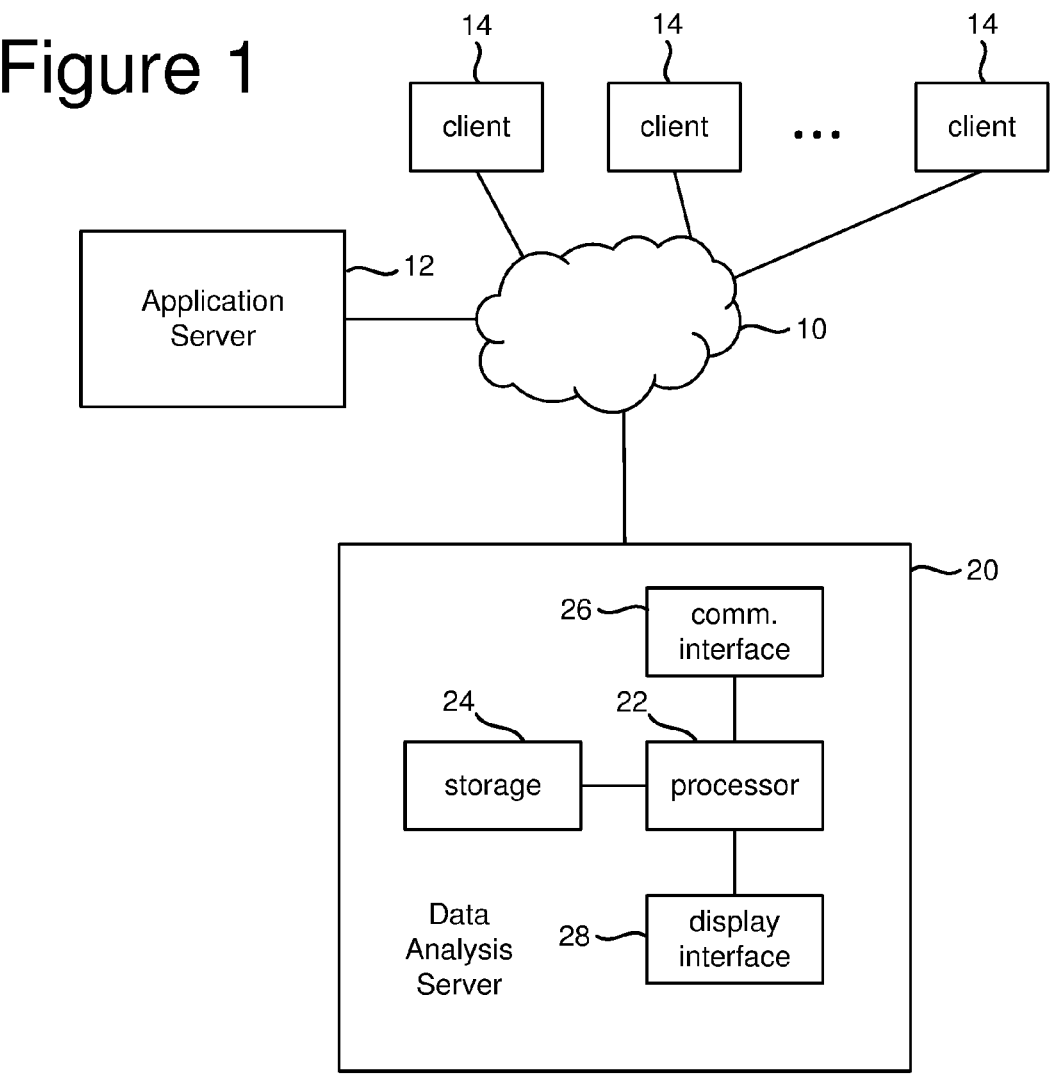
FIG. 1 Is a block diagram depicting a data processing system.

A system is disclosed that automatically detects bots and/or botnets accessing network resources. FIG. 1 is a block diagram depicting a data processing system that can implement the technology described herein. More specifically, FIG. 1 shows Application Server 12 connected to the Internet 10. In one embodiment, Application Server 12 is implementing a website such as an e-commerce site, information site, or any other type of websites. In one example embodiment, Application Server 12 can be implemented using an Apache Server or any other type of application or web server. Application Server 12 is in communication (via Internet 10) with a number of clients 14. In one embodiment, Application Server 12 generates one or more log files that document interaction with clients 14. In addition, log files can be generated to document other actions, states or conditions of Application Server 12. Any of these log files can be provided from Application Server 10 (or another entity) to Data Analysis Server 20 for data analysis such as for automatic detection of bots and/or botnets.

In one embodiment, the data provided to Data Analysis Server 20 from Application Server 12 can be provided using an agent. For example, an agent may monitor changing of a log file or other data file in one or more directories and push the updates to Data Analysis Server 20. In an agentless embodiment, Data Analysis Server 20 pulls data from Application Server 12 via an API associated with Application Server 12. In another alternative, the data can be streamed from Application Server 12 to Data Analysis Server 20. In yet another embodiment, a user may manually transfer a file from Application Server 12 to Data Analysis Server 20. Although in the above embodiments the data is provided to Data Analysis Server 20 from Application Server 12, in other embodiments at Data Analysis Server 20 can obtain the data from another source.

Data analysis server 20 includes a processor 22 connected to storage device 24, communication interface 26 and display interface 28. Processor 22 includes one or more microprocessors (or processors). Storage device 24 includes RAM, flash memory, other semi-conductor memory, disk drives and/or other storage devices. Storage device 24 can include one or multiple storage devices. Display interface 28 includes an electrical interface to any type of display device including a monitor, television, projector, head mounted display, etc. Communication interface 26 includes an electrical circuit allowing for communication to Application Server 12 (or other clients) via Internet 10 (or other networks), such as a network card, modem, communication port, wireless network interface, etc. In one embodiment, software stored in storage device 24 is used to program processor 22 to perform the methods described below on data that is also stored in storage device 24.

It is possible that one or more of clients 14 are bots. Multiple bots may comprise a botnet. Data analysis server 20 is configured to automatically detect bots and/or botnets accessing network resources of application server 12 based on the log files from application server 12 using the techniques described below.

In one set of embodiments, the system (e.g., data analysis server 20) is further configured to block any bots (including all members of a detected botnet) from further visiting and/or accessing the network resources in response to detecting the bots and/or botnets. For example, the IP addresses of any bots (including all members of a detected botnet) are added to a list of bots by data analysis server 20. That list is provided to application server 12. When a request is received at application server 12, the IP address of the source of the request is checked against the list of bots. If the IP address of the source of the request is on the list of bots, then the request is ignored, declined, diverted or responded to with an error message. The checking of the IP address of the source of the request against the list of bots can be performed by application server 12, data analysis server 20 (i.e. at the request of the application server) or another entity.

Figure 2:
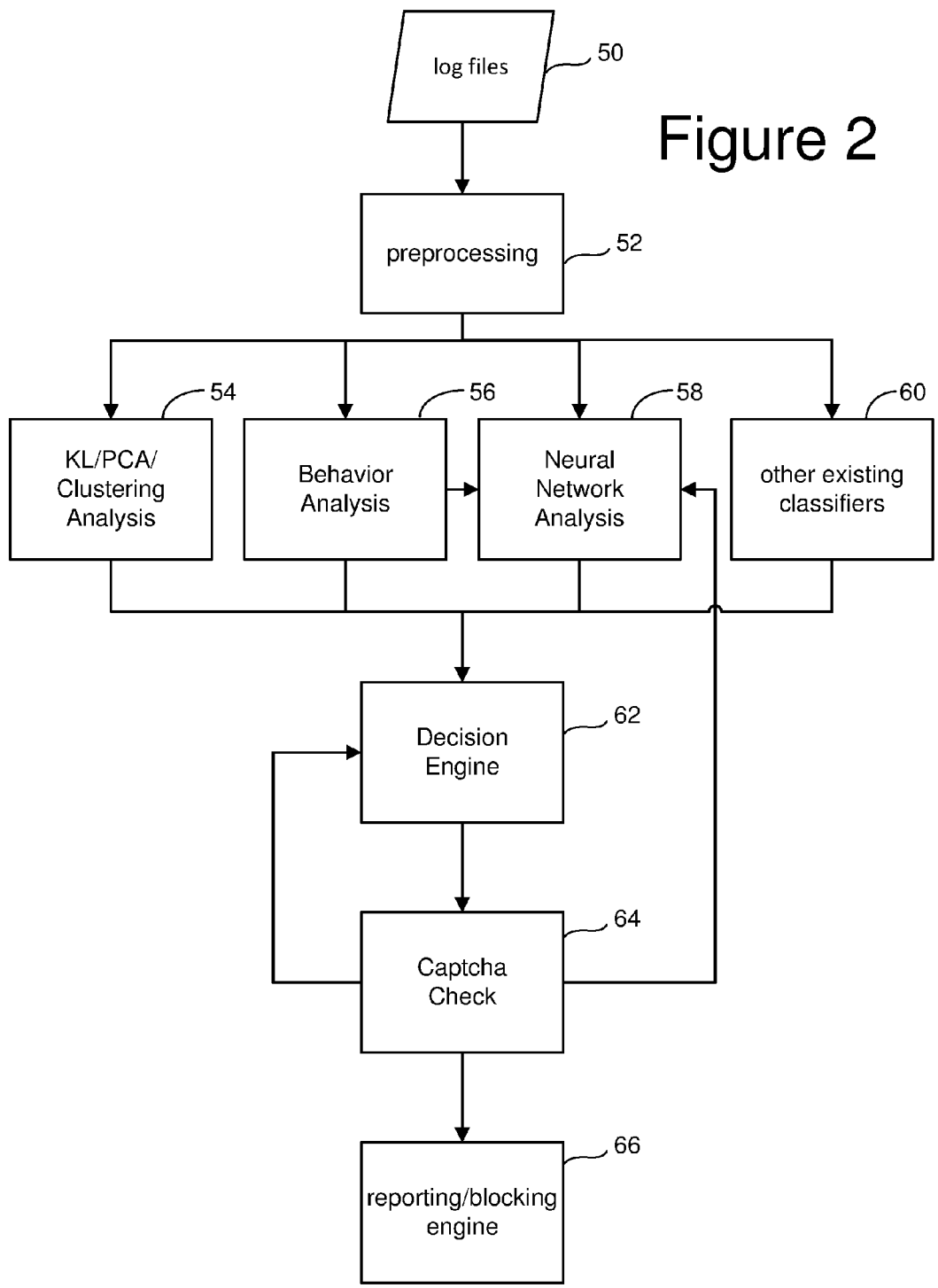
FIG. 2 is a block diagram of software and/or hardware modules of the data analysis server that are used to detect bots and/or botnets.

FIG. 2 is a block diagram depicting the components of data analysis server 20. For example, the components of FIG. 2 can include software modules residing in storage 24 for programming processor 22. In alternative embodiments, one, some or all of the components of FIG. 2 can be dedicated hardware circuits customized to perform the functions described below. The components of data analysis server 20 will receive one or more log files 50. In one embodiment, log files 50 are Apache web access logs, that include (at least) a set of records each comprising a timestamp, an IP address for the source of request (the requester) and the target URL (Uniform Resource Locator) that is a target of the request. The log files are preprocessed by preprocessing module 52. The output of preprocessing module 52 is provided to four sets of classifiers: (1) KL/PCA/clustering analysis module 54; (2) behavior analysis module 56; (3) neural network analysis module 58; and (4) one or more other existing classifiers 60. Preprocessing module 52 processes the log files to be the appropriate input format for modules 54-60. In one embodiment, the preprocessing is different for each of the modules 54-60. In other embodiments, the preprocessing can be common for one or more of modules 54-60. Each of the modules 54-60 performs an analysis to detect bots and/or botnets. KL/PCA/Clustering analysis module 54 uses a divergence analysis and variance analysis to identify bots and botnets. Behavior analysis module 56 identifies entities that are behaving sufficiently different than human users. Neural network analysis 58 uses a deep loading process to determine if a request for a network resource is from a bot. Other existing classifiers module 60 can include any one or more prior art technologies used for detecting bots or botnets.

The output of modules 54-60 are provided to decision engine 62. In one embodiment, decision engine 62 receives lists of potential bots and/or botnets from the modules (filters/classifiers) 54-60 and chooses an output set of bots from those lists based on combining the lists and/or rejecting portions or all of any of the lists. Decision engine 62 can use any one of various methodologies for choosing which bots from the four filters/modules will be output. In some embodiments, decision engine 62 will only output bots that appeared in lists from two or more of the modules 54-60. In another embodiment, decision engine 62 will report all bots identified by modules 54-60 unless one or more of the modules identify the bot as a false positive.

The output of decision engine 62 is provided to Captcha check module 64. A Captcha (Completely Automated Public Turing test to tell Computers and Humans Apart) is a type of challenge-response test using computers to determine whether or not a user is a human. In one example, the system provides a picture with some distorted characters and asks the user to type what the characters are. This kind of work is easy for humans, and hard for bots. In one embodiment, when decision engine 62 outputs an IP address for a potential bot, Captcha check module 64 will perform a Captcha test for that bot. For example, the IP address can be contacted and asked to perform the Captcha test. Alternatively, the next time that IP address sends a request to the system, the system can provide the Captcha test. If the user fails the test, which will provide the system with a confirmation that the IP address is for a bot, that confirmation can be fed back to decision engine 62. If the IP address is able to successfully perform the Captcha test, then feedback will be provided to decision engine 62 to remove that IP address from the list of bots because the IP address is associated with a human.

The output decision engine 62, after any Captcha checks have been performed by module 64, are provided to reporting/blocking engine 66. In one embodiment, reporting/blocking engine 66 can generate an alert to a software entity, computer hardware entity or human with a list of one or more bots and/or botnets identified. The alerts can include an e-mail address, text message, onscreen message, print out, etc. Access to the system can be blocked for those IP addresses determined to be a bot. For example, the IP address of any bots (including all members of a detected botnet) are added to a list of bots by data analysis server 20. That list is provided to application server 12. When a request is received at application server 12, the IP address of the source of the request is checked against the list of bots. If the IP address of the source of the request is on the list of bots, then the request is ignored, declined, responded to with an error message or redirected to another page (e.g., error page, reporting page indicating that it is a bot, or dummy page).

The declining and redirecting can also be performed by or at the direction of application server 12

Figure 3:
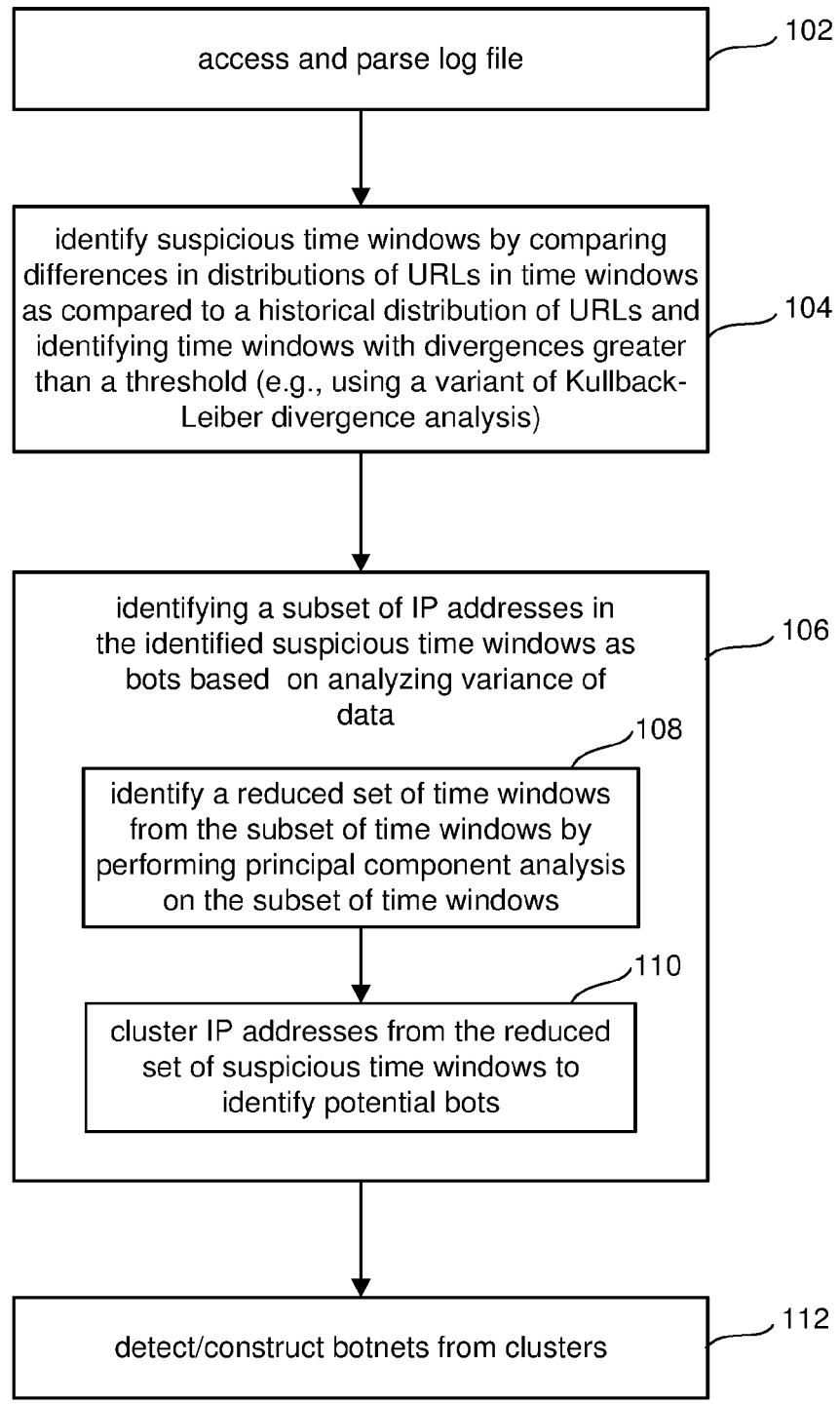
FIG. 3 is a flow chart describing one embodiment of a process for detecting bots and/or botnets based on divergence and variance.

FIG. 3 is a flowchart describing one embodiment of a process for detecting bots and/or botnets based on divergence and variance. For example, the process of FIG. 3 is one embodiment of the function performed by KL/PC/Clustering analysis module 54. In step 102 of FIG. 3, the system accesses and parses a log file. In step 104, the system identifies suspicious time windows from the log file by comparing differences in distributions with URLs in time windows as compared to historical distribution of URLs and identifying time windows with divergences greater than a threshold. For example, step 104 can include performing Kullback-Leiber divergence analysis or a variant of Kullback-Leiber divergence analysis. As discussed above, the log files will include entries for each request for network resources. A network resource will be requested by a client device associated with an IP address. In one embodiment, the log file will identify the IP address for the requesting device, the resource requested (URL) and the time of the request. In step 106, the system identifies a subset of IP addresses in the identified suspicious windows as bots based on analyzing variance of data. In one embodiment, step 106 includes identifying a reduced set of time windows from the subset of time windows by performing principal component analysis on the subset of time windows (sub-step 108) and clustering IP addresses from the reduced set of suspicious time windows to identify potential bots (sub-step 110) In step 112, botnets are detected and constructed from the clusters created in step 106. The result of the process of FIG. 3 is a list of potential bots and a list of potential botnets. As discussed above, the system can then use a list of bots and botnets to block those bots from accessing network resources.

Figure 5A:
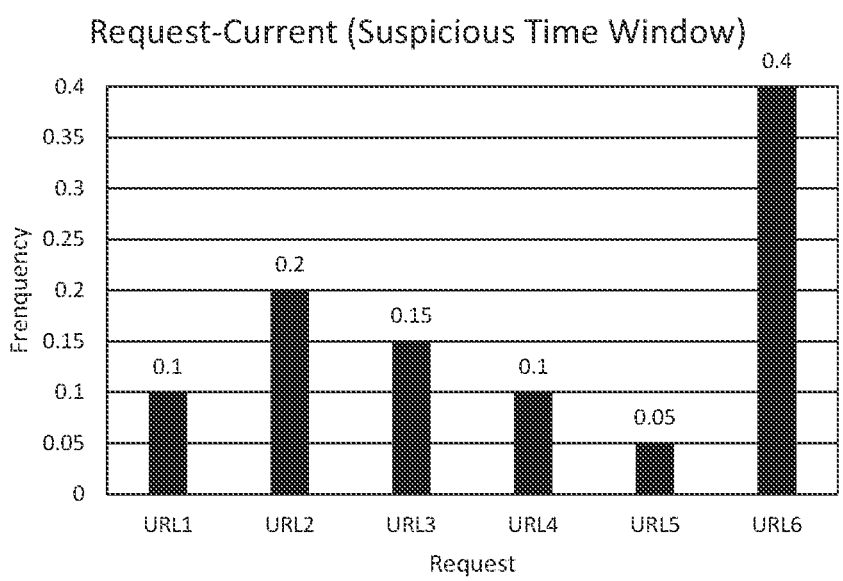
FIG. 5A is a histogram of current request data.

FIG. 4 is a flowchart describing one embodiment of a process for finding suspicious time windows. That is, the process of FIG. 4 is one example implementation of step 104 of FIG. 3. In step 138, the data of a log file is grouped into time windows. That is, the system looks over the entire historical log file and creates a set of time windows. For example, the system defines the length of one time window $\Delta$ based on the request rate, then the request whose timestamp is bigger than or equal to Start_time+(n-1)*$\Delta$ and less than Start_time+n*$\Delta$ will be placed into the nth time window. When dealing with streaming data, a new time window will be created based on the formula above. A time window can be as short as one second or as long as one minute. Any meaningful length can be used. In one embodiment, the time windows are consecutive, while in other embodiments time windows can overlap. In step 140, data distributions are created for each individual time window of data. Thus, the data of the log file is divided into a set of time windows. For each time window, the system creates a histogram of URL requests versus frequency of requests. That is, the x axis of the histogram includes a set of URLs requested during the time window. The y axis indicates a frequency that those URLs have been requested. In one embodiment, the frequency data of the y axis is absolute value. In other embodiments, a logarithm of the number of requests, a normalized value, probability value, etc. can be used. FIG. 5A is a histogram providing one example of a data distribution for a time window. Note that although FIG. 5A graphically shows a histogram, in some embodiments the data analysis server 20 (or other computing device) will not actually draw a histogram. Rather, the building of a histogram includes creating the data and/or formulas that describe or otherwise represent the histogram.

Figure 5B:
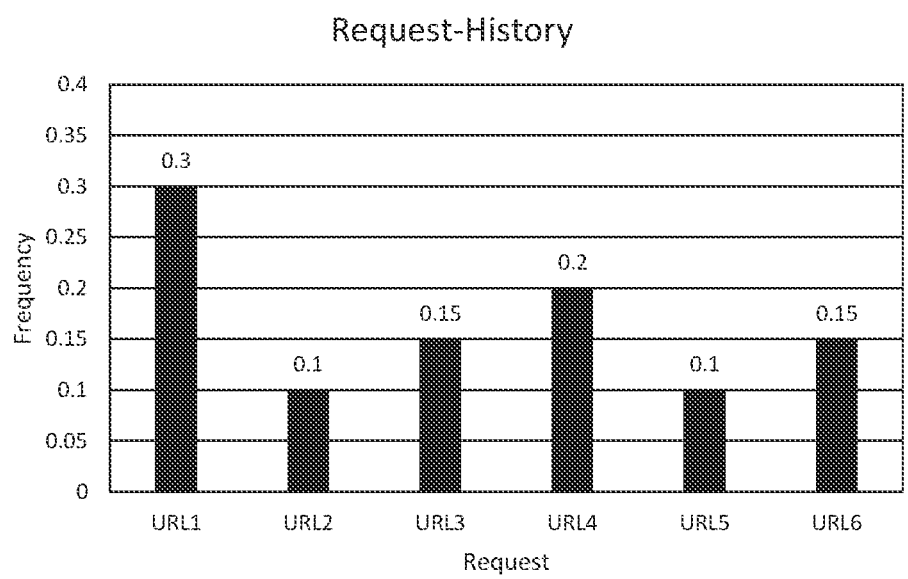
FIG. 5B is a histogram of historical request data.

In step 142 of FIG. 4, the system creates or updates a historical data distribution (e.g., histogram) for all time windows, averaged together, forming a historical summary of data. This historical summary of data can be created based on previous log files, previous log files plus the current log file, or other subset of historical data. FIG. 5B is a histogram that represents an example data distribution for historical data. In one embodiment, step 142 is performed prior to step 140.

In step 144, the system performs a divergence analysis between each of the individual time windows created in step 140 and the one historical data distribution created in step 142. In one embodiment, step 144 includes using Kullback-Leibler (KL) divergence for determining divergence information between each time window and the historical (or average) data distribution. In one example implementation, the KL divergence is used to create a suspicious score. In probability theory and information theory, KL divergence is a measure of the divergence or difference between two data distributions. KL divergence is known in the art. In one embodiment, the KL divergence is defined as:

$$KL\,\text{Divergence} = \sum_i H_c(i) \log \frac{H_c(i)}{H_h(i)}$$

Based on the KL divergence, the suspicious score is defined as a variant of Kullback-Leibler divergence for time windows as follows:

$$\text{Suspicious Score} = \log \frac{N_c}{N_h} + \sum_i H_c(i) \left| \log \frac{H_c(i)}{H_h(i)} \right|$$

where:

k is the number of requests in time window being operated on;

$N_h$ is the average number of requests over all time windows;

$H_c(i)$ is the frequency of URL i in time window being operated on; and $H_h(i)$ is the average frequency of URL i over all time windows.

Note that a variant of Kullback-Leibler divergence includes standard Kullback-Leibler divergence as well as variations. The above example is a variant of Kullback-Leibler divergence because of the addition of the term:

$$\log \frac{N_c}{N_h}.$$

Figure 5C:
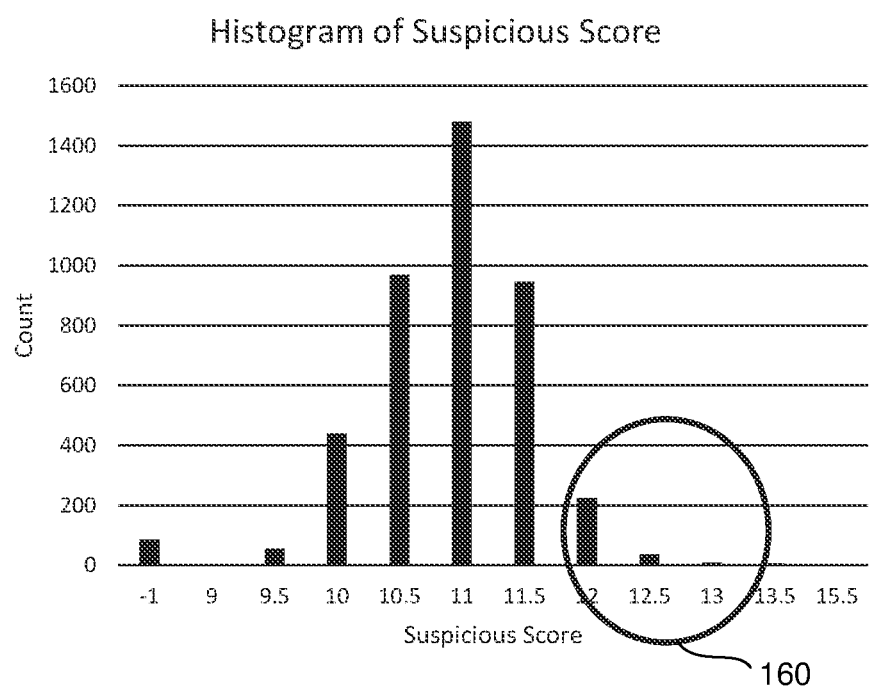
FIG. 5C is a histogram of suspicious scores.

The result of step 144 is a suspicious score for each time window. In step 146, the system creates a histogram (or other ordering) of suspicious scores. FIG. 5C is one example of a histogram created in step 146. On the x axis are the suspicious scores for the particular log file being operated on. On the y axis is the count of number time windows within that log file that have a suspicious score which is in the particular range (suspicious scores are floating point numbers). In step 148 of FIG. 4, the system automatically and dynamically determines a customized portion of the histogram that represents the suspicious time windows. FIG. 5C shows circle 160 that indicates the portion of the histogram that represents suspicious time windows. In this one example, any time window with a suspicious score greater than 12 will be a suspicious time window. In one example implementation, circle 160 is created by identifying the average plus three standard deviations above the average.

Figure 6:
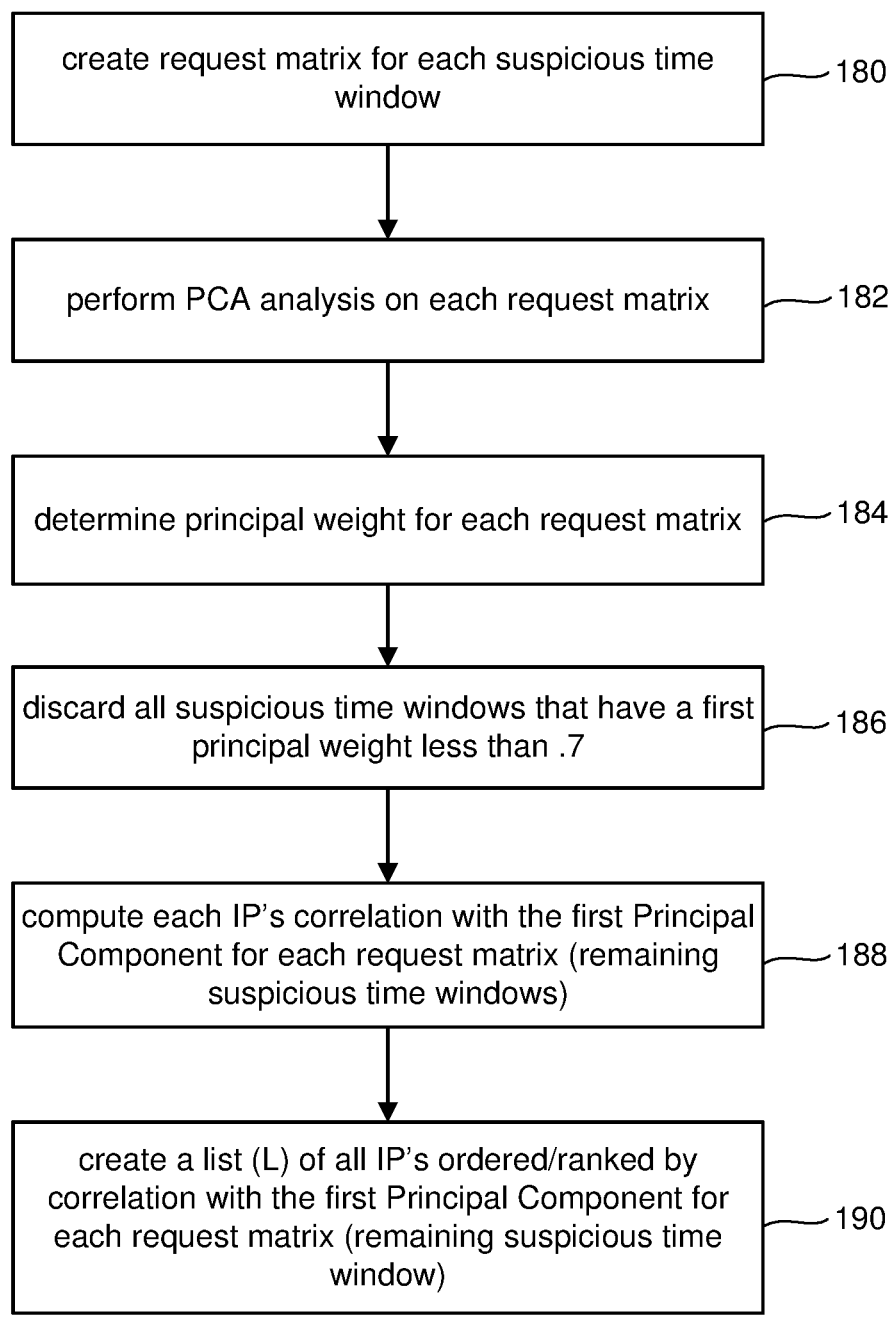
FIG. 6 is a flow chart describing one embodiment of a process for identifying a reduced set of time windows from the suspicious time windows by performing principal component analysis on the suspicious time windows.

FIG. 6 is a flow chart describing one embodiment of a process for identifying a reduced set of time windows from the suspicious time windows by performing principal component analysis on the suspicious time windows. Thus, the process of FIG. 6 is one example implementation of sub-step 108 of FIG. 3. In one example embodiment, the process of FIG. 6 performs principal component analysis on suspicious time windows to further identify a subset of highly suspicious time windows from the set of suspicious time windows. Principal component analysis (PCA) is a statistical procedure known in the art that using an orthogonal transformation to observations of possibly correlated variables into a state of values of linearly uncorrelated variables called principal components. This transformation is defined in such a way that the first principal component has the largest possible variance (that is, accounts for much of the variability in the data as possible), and any succeeding component in turn has the highest variance possible under the constraint that it is orthogonal to the preceding components. The resulting factors are an uncorrelated orthogonal bases set. Each factor in this base set is a principal component (PC). An IP address that is more correlated with the principal component is more likely to be a bot.

In step 180 of FIG. 6, the system creates a request matrix, denoted by bold big letter X, for each suspicious time window. Suppose in the time window there are m different requests made by those IP addresses in this time window, and there are n different IPs in this time window, then X is a m-row n-column matrix. Suppose the m distinct requests are indexed by 1, 2, . . . , m, and the n distinct IP addresses are indexed by 1, 2, . . . , n. In the request matrix, the value at the ith row and jth column, denoted by X(i,j), is the number of times the jth IP address made the ith request. The jth column of the request matrix represents the numbers of times the jth IP made the 1st, 2nd, . . . , mth requests, and such column is named the request vector of the jth IP address of this time window.

FIGS. 7A and 7B provide examples of request matrices. The request matrix of FIG. 7A provides an example that includes two bots: Bot A and Both B. The request matrix of FIG. 7B provides an example that includes a botnet. The request matrix for FIG. 7A includes six columns. Each column represents an IP address (client, requester, etc.). Each row of the request matrix indicates a request URL (for a network resource). Thus, each data value indicates how many requests for a particular URL were made by a particular IP address during the suspicious time window associated with the request matrix. In the example of FIG. 7A, the first IP address made 12 requests to the first URL during the particular time window. A quick look at the data in FIG. 7B indicates that the first two columns have much higher request numbers than the other four columns, possibly suggesting that the first two columns are associated with bots (e.g., bot A and bot B). In FIG. 7B, none of the columns have particularly higher numbers than the other columns; however, the first column, fifth column and sixth column have very similar numbers and suggest a correlated botnet. More details for discovering bots and botnets are provided below. The result of step 180 of FIG. 6 is a request matrix (like the request matrices of FIG. 7A or 7B for each suspicious time window.

In step 182, the system performs principal component analysis on each of the request matrices. In step 184, the system determines the principal weight for each request matrix, based on the PCA analysis of step 182. Suppose we have m distinct requests and n distinct IP addresses in a suspicious time window, define the request matrix X of a suspicious time window as an m-row n-column matrix, where the element at the ith row and jth column, denoted by X(i,j), is the number of times the jth IP address makes the ith request during that time window. We denote the ith row of X as X(i,•), and the jth column of X as X(•,j). Let $\overline{X}$= $(\overline{X(•,1)}, \ldots, \overline{X(•,n)})$ be a vector consisting of n components where the jth component $$\overline{X(\cdot, J)} = \frac{1}{m}\sum_{i=1}^{m} X(i, j)$$

is the average of elements in X(•,j), i.e. the average of elements in the jth column of X, i.e. the average number of times the jth IP makes each distinct request in the time window. The covariance matrix of X is defined as $$S(X) = \frac{1}{m-1}\left(X^T X - \overline{X}^T \overline{X}\right)$$

where m is the number of distinct request in the time window (also the number of rows of X), and $X^T$ is the transposed matrix of X, $\overline{X}^T$ is the transposed vector of $\overline{X}$. The principal weight is the maximum eigenvalue S(X). Let α be the eigenvector corresponds to the maximum eigenvalue, then the principal component is Xα, which is a linear combination of columns of X.

In step 186, the system discards all suspicious time windows that have a principal weight less than 0.7. In other embodiments, the filtering of suspicious time windows can be at a first principal weight less than or greater than 0.7. In other embodiments, the filtering point can be dynamically determined. The result of step 186 is a plurality of remaining suspicious time windows that are referred to as highly suspicious time windows/

In step 188 of FIG. 6, the system computes each requester's (each IP address') correlation with the first principal component for each request matrix (for each remaining suspicious time window). Pearson's correlation is used to compute the correlation between each requester (IP address) and the principal component, i.e. the correlation between vectors X(•,j) and Xα. The correlation value ranges between −1 and 1. A high positive value means X(•,j) is positively correlated with the principal component and is more likely to be either a single bot, or a member of a botnet. Other values, such like negative values or low positive values indicate the IP address (requester) are negatively correlated, or mildly positively correlated with the principal component.

In step 190, the system creates a list (L) of all IP addresses ordered/ranked by correlation with the first principal component for each request matrix remaining (suspicious time window remaining). That is, each IP address is ranked by the correlation number computed in step 188. An IP address of higher rank in list L is more likely to be a bot.

FIG. 8 is a flow chart describing one embodiment of a process for clustering suspicious IP addresses from the highly suspicious time windows to identify potential bots. Thus, the process of FIG. 8 is one example implementation of sub-step 110 of FIG. 3. In one embodiment, the result of FIG. 8 is output as the potential set of bots. In another alternative embodiment, the list L is output as the potential set of bots.

In step 202 of FIG. 8, the system computes/creates a separate correlation matrix for each request matrix that has not previously been discarded. FIG. 9A depicts one example of a correlation matrix for the request matrix of FIG. 7A. FIG. 9B provides one example of a correlation matrix for the request matrix of FIG. 7B. Each data value represents a correlation between two IP addresses, computed using Pearson's correlation. For example, looking at FIG. 9A, a data value at the intersection of the first column in the first row is one because the correlation between the first IP address and itself is one. The data value at the second column and first row (−0.68) represents correlation between the first IP address (requester) and the second IP address (requester) which are the first column and second column of FIG. 7A (referenced at the bottom of FIG. 7A as bot A and bot B). Each number is between −1 and 1. The number −1 represents no correlation. The number +1 represents perfect correlation. Numbers closer to 1 represent more correlation. In FIG. 9B, the number 0.99 in the first row and fifth column is in a box to highlight that number indicates it showing a very high correlation between the first IP address and the fifth IP address (corresponding to the first and fifth columns of FIG. 7B). This suggests that these two IP addresses (requesters) are part of a botnet.

Looking back at FIG. 8, in step 204, the system calculates the average correlation (referred to as r). The process of FIG. 8 is performed separately for each remaining time window (each remaining request matrix). Thus, the average correlation r is created separately for each remaining time window or correlation matrix. In step 206, the IP address on the top of the list L (see step 190 of FIG. 6), is added to a new cluster. In step 208, other IP addresses from the list L are added to the cluster if the distance between the other IP addresses and the IP address that was added from the top of the list to the new cluster is less than or shorter than a threshold based on the average correlation. The distance between the top IP address and each of other IP address is calculated as one minus the correlation between the top IP address and the other IP address. One example of a distance threshold is $0.3(1-r)$.

Since an IP address more correlated to the principal component is more likely to be a bot, then the system ranks all IP addresses according to their correlation with the principal component and derives the ranked list L. The clustering first picks the top IP address, denoted as $p_0$, in the ranked list L and creates a cluster that only contains $p_0$. The distance between $p_0$ and another IP address p is calculated as 1 minus the correlation between $p_0$ and p. Then all other IP addresses are examined: if the current examined IP address p has a distance shorter than a threshold (e.g. $0.3(1-r)$), then we put p in the same cluster. After one iteration, we have a group of IP addresses that have short distance with $p_0$. They will also have short distance with each other due to that the distance is based on correlation.

In step 210 of FIG. 8, all IP addresses added to the cluster are removed from the ranked list L. In step 212, it is determined whether the three clusters have been created. It is the first time that steps 206-210 were performed, that only one cluster was created, and the process will loop back from step 212 to step 206 and perform the creation of the second cluster. After three clusters are created (step 212), then in step 214 the IP addresses in the three clusters are reported as potential bots. In other embodiments, more or less than three clusters can be created.

Figure 10:
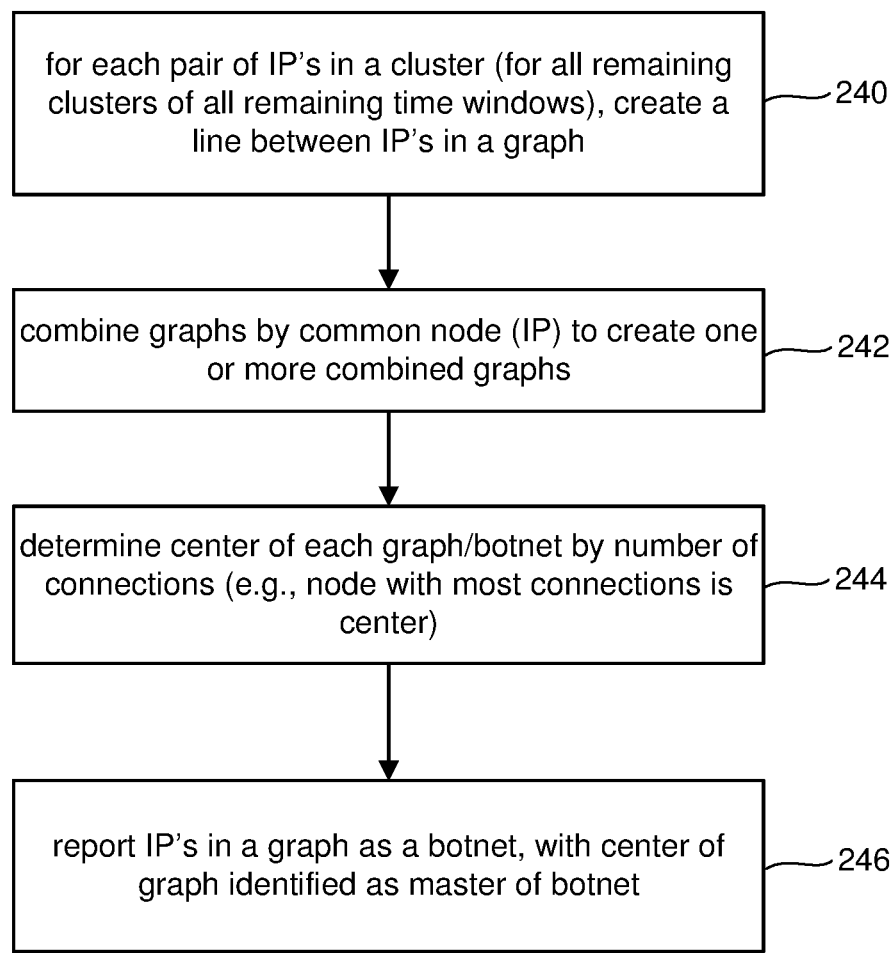
FIG. 10 is a flow chart describing one embodiment of a process for constructing botnets using clusters.
Figure 11A:
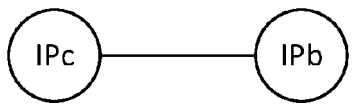
FIG. 11A is an example graph.
Figure 11B:
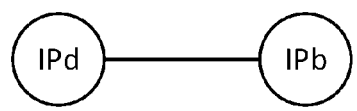
FIG. 11B is an example graph.
Figure 11C:
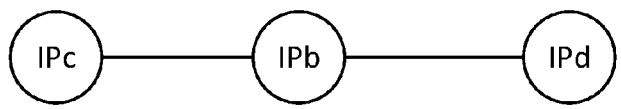
FIG. 11C is an example graph.
Figure 11D:
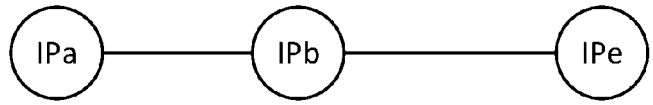
FIG. 11D is an example graph.
Figure 11E:
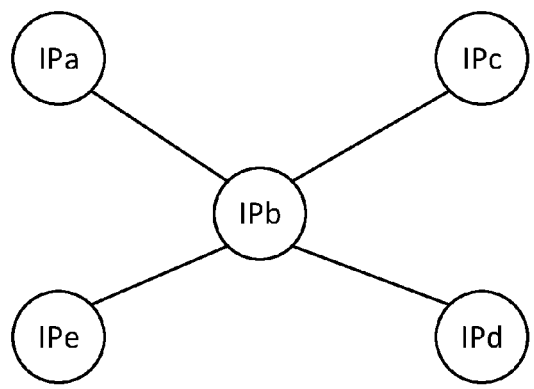
FIG. 11E is an example graph.

FIG. 10 is a flow chart describing one embodiment of a process for detecting/constructing botnets using the clusters created by the process of FIG. 8. Thus, the process of FIG. 10 is one example implementation of step 110 of FIG. 3. In step 240, for each pair of IP addresses in a cluster (for all remaining clusters of all remaining time windows) create a graph with a node for each IP address and a line between the IP addresses. For example, FIG. 11A is a graph depicting two IP addresses (IPb and IPc) which are used to create two nodes IPb and IPc with a line drawn between the two nodes. Step 240 of FIG. 10 includes creating many graphs like that of FIG. 11A. In step 242, the system combine graphs by a common node to create one or more combined graphs. That is, some of the graphs will have a node in common. Those graphs can be combined at the node in common. For example, the graphs of FIGS. 11A and 11B have a node in common, IPb. Therefore, the graphs of FIGS. 11A and 11B will be combined to that of the form depicted in the graph of FIG. 11C which shows the node IPb connected to node IPc and IPd. Step 242 of FIG. 10 is likely to create many combined graphs like that of FIG. 11C and/or FIG. 11D. In some instances, the combined graphs can additionally be combined to create larger graphs. For example, the combined graphs of FIGS. 11C and 11D can be combined to create the graph of FIG. 11E. In step 244, the system determines the center of each graph by number of connections. That is, the system will see which nodes in the graph have the most connections. That node is considered the center of the graph, and will also be assumed to be the center of the botnet. That is, all the nodes in the combined graph will be considered a botnet with the center node being the node in charge of the botnet (the master). For example, FIG. 11E shows a graph with five nodes IPa, IPb, IPc, IPd and IPe, each of those five nodes represents five bots that operate as a botnet with bot IPb being the center or master of the botnet. In step 246 of FIG. 10, the system reports the IP addresses in the combined graph as a botnet with the center of the graph identified as the master of the botnet. In some embodiments, only those graphs having more than X (e.g., some integer greater than 3) number of bots will be considered a botnet.

Figure 12:
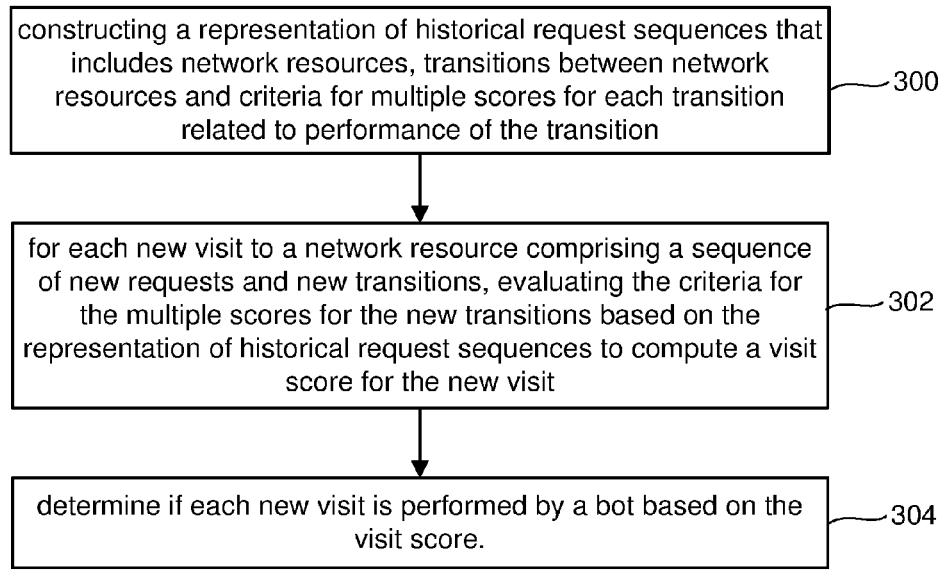
FIG. 12 is a flow chart describing one embodiment of a process for detecting bots using behavior analysis.

FIG. 12 is a flowchart describing one embodiment of a process for detecting bots using behavior analysis. That is, the process of FIG. 12 is one example implementation of the functions performed by behavior analysis module 56 of FIG. 2. Thus, the process of FIG. 12 is run in parallel to or otherwise in addition to the process of FIG. 3 in order to determine an additional or complimentary set of identification of bots. In step 300 of FIG. 12, the system constructs a representation of historical request sequences that includes network resources, transitions between network resources and criteria for multiple scores for each transition related to the performance of the transition. A network resource can be any content that can be accessed via a network, including (but not limited to) web pages, audio, video, still images, data, code, etc. A transition between network resources pertains to, while consuming, viewing or otherwise acting/accessing one network resource, a request is made for a next network resource which is then consumed, viewed or otherwise acted on or accessed. In one embodiment, a network resource is a web page and the transition between network resources is the requesting and/or loading of another web page. In some cases, the transition to another web page may require multiple requests for many items of content (e.g., html code, audio, video, still images, scripts, etc.). In step 302, for each new visit to a network resource comprising a sequence of new requests and new transitions, the system evaluates the criteria for the multiple scores for each new transition based on the representation of historical request sequences to compute a score referred to as the "visit score." Each transition may have its own score, with the scores of multiple transitions combined into the visit score. In step 304, the system determines if each new visit is being performed by a bot based on the visit score. For each new visit that is determined to be being performed by a bot, the IP address for the bot will be reported as a potential bot. As discussed above, this reporting of bots is provided to decision engine 62 which will receive a report of potential bots from multiple filters and choose a final resulting set of bots which can be reported, used to block future access, and/or used to redirect when future requests are made. More details of the steps of FIG. 12 are provided below.

Figure 13:
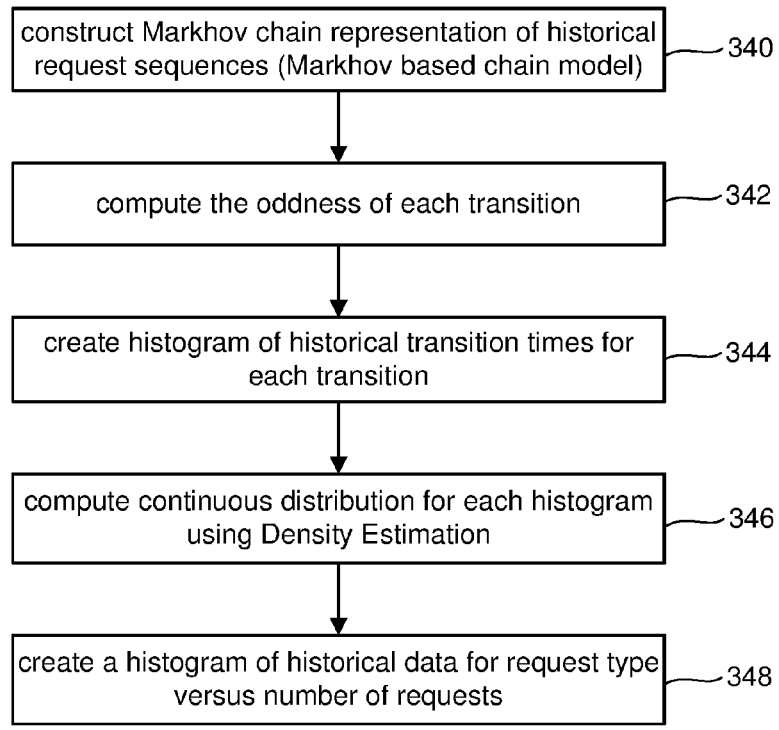
FIG. 13 is a flow chart describing one embodiment of a process for creating a Markov chain for behavior analysis.

FIG. 13 is a flowchart describing one embodiment for constructing representation of a historical request sequence that includes criteria for multiple scores for each transition related to performance of the transition. Thus, the process of FIG. 13 is one example implementation of step 300 of FIG. 12. In step 340 of FIG. 13, the system creates a representation of historical request sequences. That is, all the historical logs will be used to create a representation of previous sequences of requests. In one embodiment, a Markov chain-based behavior model is created. That is, the system constructs a Markov chain representation of IP addresses and historical request sequences. In general, a Markov chain is a representation of a random process that undergoes transitions from one state to another state (a state can also be called a node). The change of state is a transition. Each transition from a first state to a set of target states has a probability associated with that transition to indicate the probability of that transition occurring. In one embodiment, each state of the Markov chain represents a network resource. In one embodiment, each state of the Markov chain represents a web page.

Figure 14:
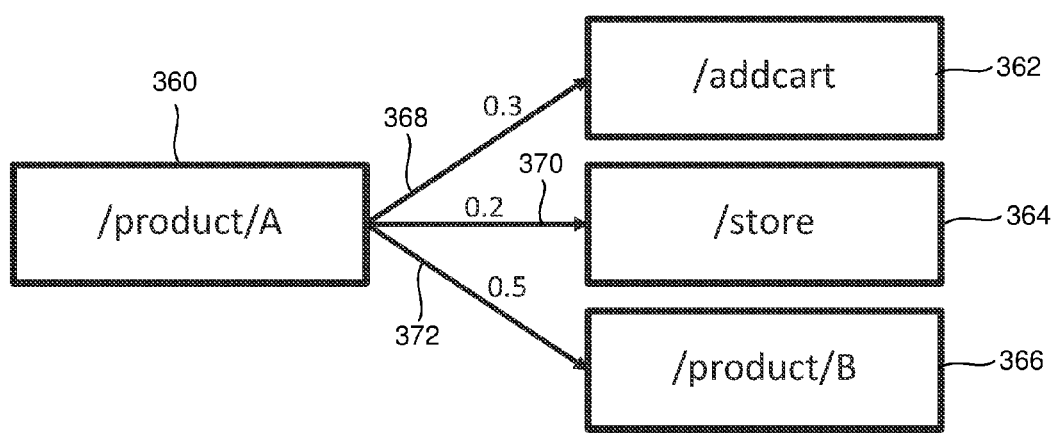
FIG. 14 shows a subset of nodes in a Markov chain.

FIG. 14 provides an example of a portion of a Markov chain that includes states 360, 362, 364 and 366. State 360 represents a web page with a URL ending in " . . . /product/A." State 362 represents a request for a URL " . . . /addcart." State 364 represents a web page with a URL " . . . /store." State 366 represents a web page with a URL " . . . /product/D." States 360, 362, 364 and 366 are examples of network resources. FIG. 14 also depicts transitions between resources 368, 370 and 372. Transition 368 represents a transition from state 360 to 362. Transition 370 represents a transition between state 360 and state 364. Transition 372 represents a transition between state 360 and state 366. The probability of transition 368 is 0.3 meaning that there is a 30% chance that when in state A (a client requesting the URL for " . . . /product/A" there is a 30% chance that the client will next ask for " . . . /addcart." The probability for transition 370 is 0.2. The probability for transition 372 is 0.5. FIG. 14 shows an example of a Markov chain which is the result of step 340; however, FIG. 14 only shows a small portion of the Markov chain.

In step 342 of FIG. 13, the system will compute an oddness score for each transition. This oddness score is referred to as oddness of transition probability. This is the first type of three types of oddness scores computed in the process of represented by FIG. 13. This oddness score is defined as Oddness of Transition Probability =

$$1 - \frac{\text{probability of transition}}{\max prob. \text{ of any transiiton from state}}$$

Therefore, as depicted in FIG. 14, the oddness of transition 368 is computed to be 0.4. Thus the Markov chain estimates the probability of the next request given the current request based on historical data. Those probabilities are called the transition probabilities and are depicted in FIG. 14. The transition probabilities are then converted into an oddness score, which in this case is referred to as the oddness of transition probability. One purpose of using oddness is to measure how strange an IP address visits the website which is not directly reflected by the quantity of probabilities.

Figure 15:
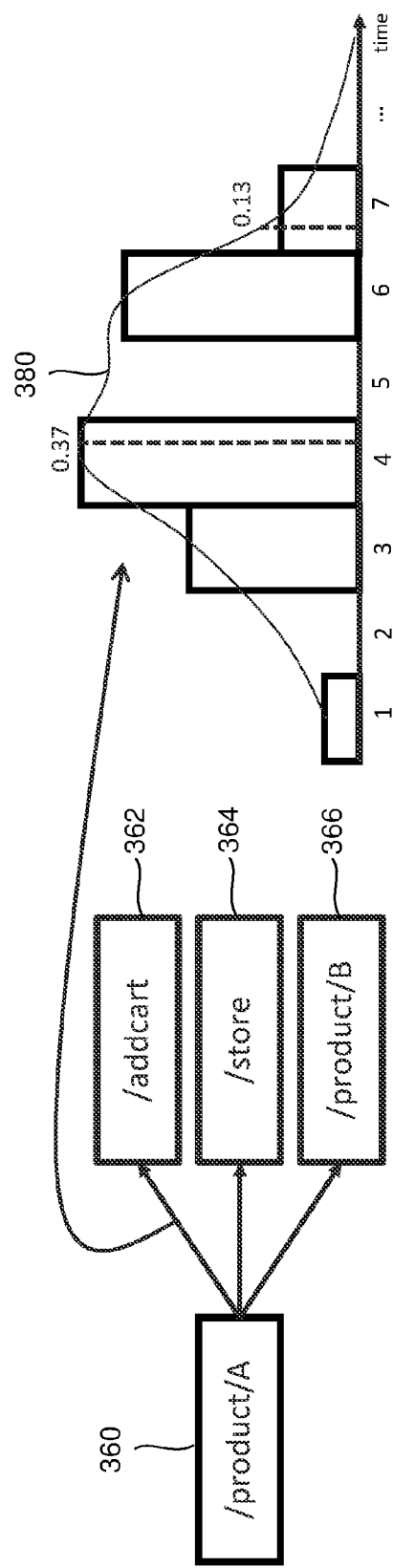
FIG. 15 shows a subset of nodes in a Markov chain and a continuous distribution of data.

In one embodiment, the system determines three oddness scores for each transition: oddness of transition probability, oddness of transition time and KL oddness. Step 342 is used to set up the system to later calculate oddness of transition probability. Steps 344 and 346 are used to set the system to later calculate oddness of transition time, which is the second type of oddness score computed in the process of represented by FIG. 13. The oddness of transition time is derived from a distribution over time reflecting how likely a transition takes place after a certain amount of time. A histogram is first constructed in step 342 based on historical transition times. For example, FIG. 15 shows a histogram created from a portion of the Markov chain depicted in FIG. 14. The histogram plots time versus quantity of requests for a given transition at that time. In step 346, a continuous distribution is computed using a density estimation for the histogram, which is depicted by line 380 in FIG. 15.

The third oddness score for each transition is referred to as KL oddness. During a transition, one IP address will make many requests to images, java scripts, stylus sheets, etc. The counted request to different resources form a histogram. The system will compute the KL divergence between a histogram of a current transition and histogram of all historical data. The discreet KL divergence is converted to a KL oddness by using a normalizing function. In step 348 of FIG. 13, the histogram of historical data of request type versus number of requests is created. Each bar on the histogram represented a request for a different type of resource (image, java script, stylus sheet, etc.). The height of each bar will be indicative of the number of requests per transition. The KL oddness will later be calculated using the following equations:

$$KL \text{ Oddness} = 2\left|\frac{1}{1+e^{-\frac{KL}{2}}} - 0.5\right|$$

$$KL = \sum_i H(i)\log\frac{P(i)}{H(i)}$$

where:

P(i) is the height of the ith bar for the current transition

H(i) is the average height of the ith bar from historical data

Figure 16:
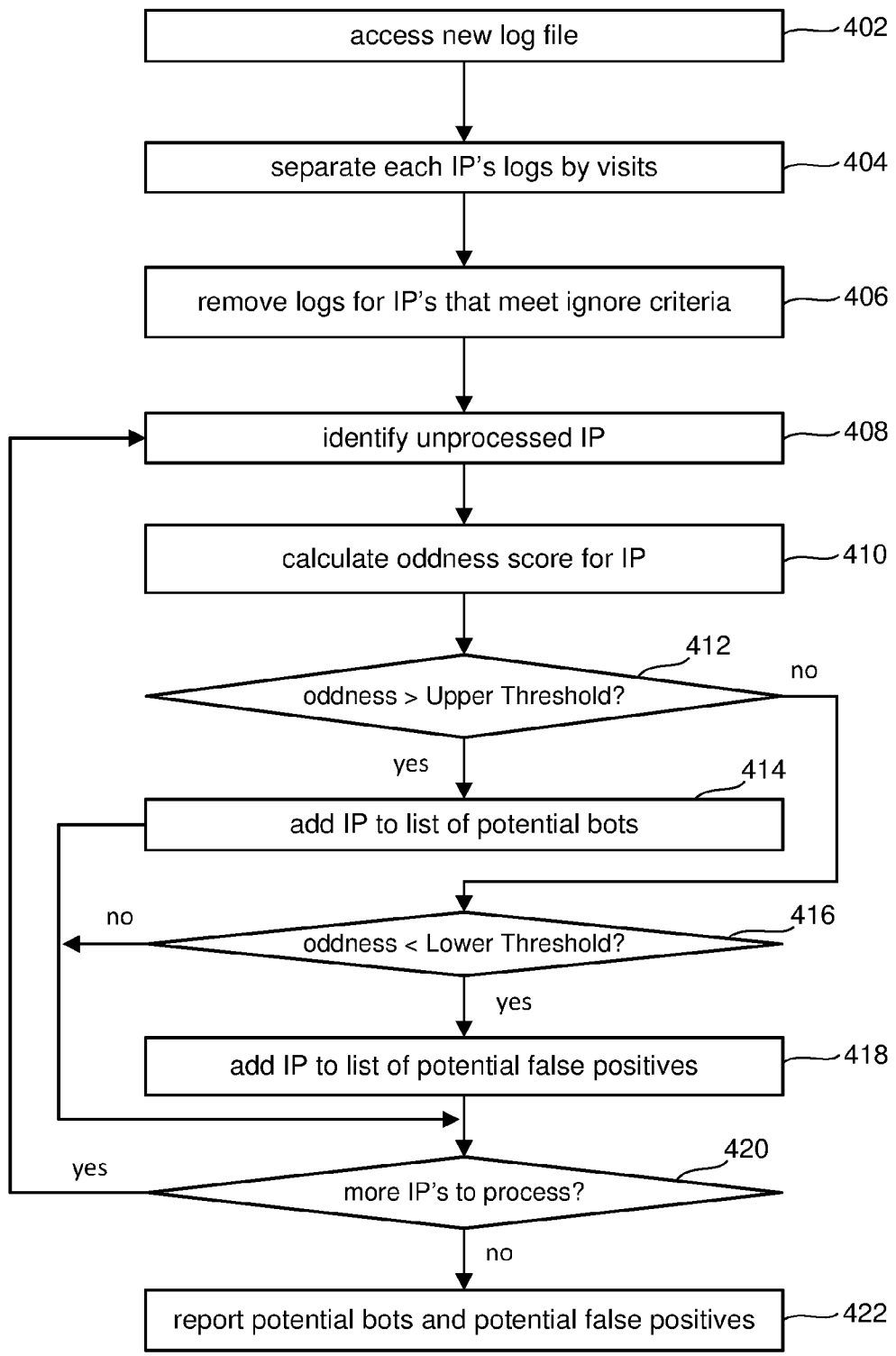
FIG. 16 is a flow chart describing one embodiment of a process for detecting bots using behavior analysis.
Figure 17:
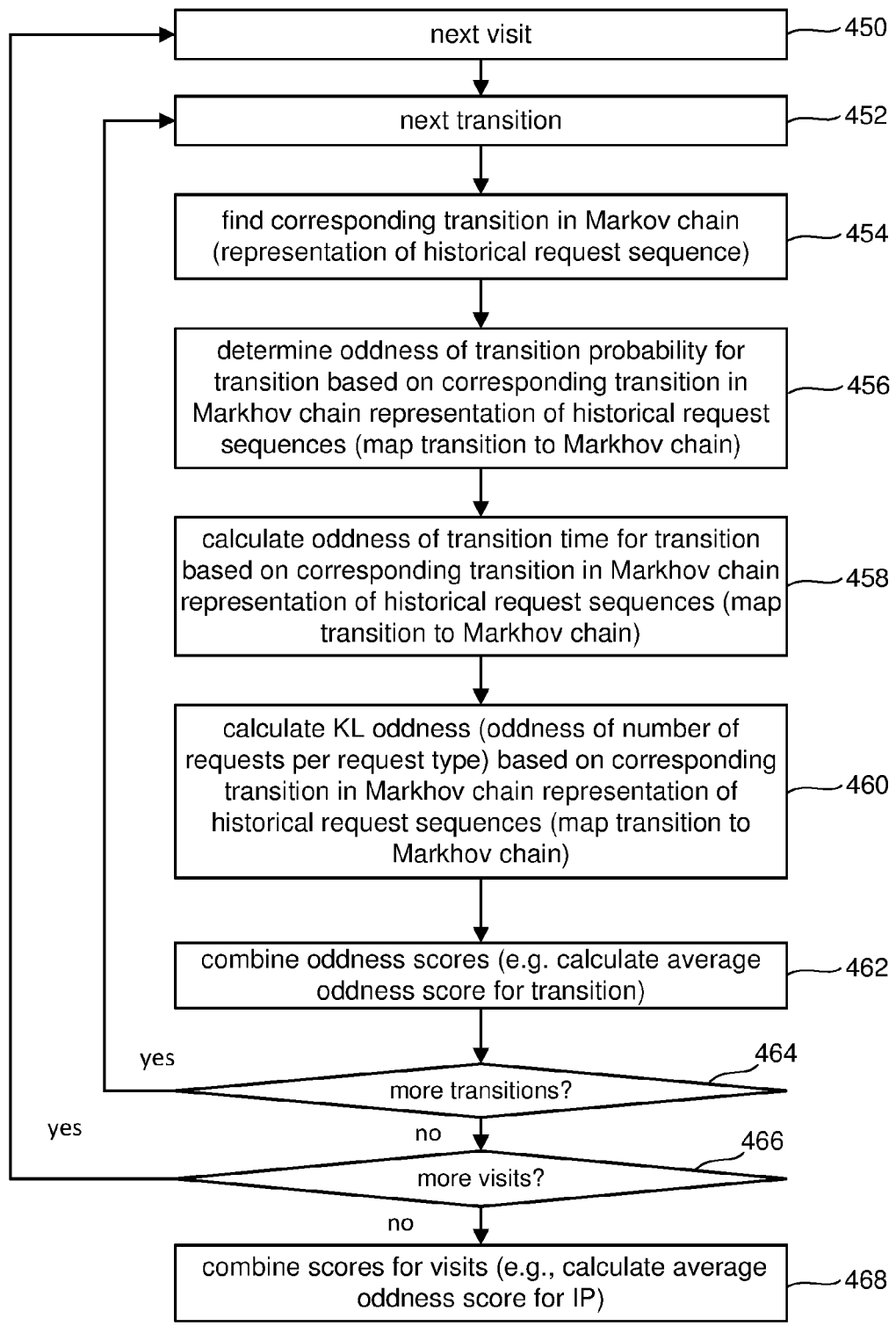
FIG. 17 is a flow chart describing one embodiment of a process for calculating an oddness score.

FIG. 16 is a flowchart describing one embodiment of a process for evaluating the criteria for multiple scores for new transactions based on the representation of historical request sequences to compute a visit score for each visit of a log file (or other data structure). That is, the process of FIG. 17 is one example implementation of step 302 of FIG. 12. In step 402 of FIG. 16, the system accesses a new log file. In step 404, the system separates the log entries for each IP address by visit. In step 406, the system remove log entries for IP addresses that meet certain ignore criteria. For example, the system can ignore log entries for IP addresses that are self-marked as bots, have ever visited a "robots.txt," have distinct main requests (a web page request is a main request) less than three, etc. to reduce noise.

In step 408, an unprocessed IP address is identified. When the process of FIG. 16 first starts, none of the IP addresses have been processed yet. As the loop from step 410 to step 420 starts processing IP addresses, then the system will have to choose a new unprocessed IP address. In step 410, the system calculates the multiple oddness scores for the IP address and then combines them, as discussed below. For a visit. In one embodiment, the system will create an oddness score for each visit for each IP address. In another embodiment, the system will calculate a combined score for an IP address that combines (e.g., averages) all of the IP scores for all visits. If the oddness score created in step 410 for an IP address (or for a visit) is greater than an upper threshold (step 412) then that IP address is added to a list of potential bots in step 414. If the oddness score calculated in step 410 is not greater than the upper threshold, then in step 416 it is determined whether the oddness score is less than a lower threshold. If the IP address has an oddness score lower than the lower threshold, then it is assumed that the IP address is clearly not a bot and should be in a list of potential false positives in step 418. That is, the system will report a visit by an IP address as a false positive based on the visit score (or combined visit scores). Thus, any reporting of bots will have the IP address of the false positive removed from the reporting. In step 420, it is determined whether there are any more IP addresses to process. If so, then the process loops back to step 408 and processes the next IP address. If there are no more IP addresses to process (step 420), then the list of potential bots and list of potential false positives are reported in step 422 (therefore, step 412-422 can be thought of as an example implementation of step 304 of FIG. 12). In one embodiment the upper threshold of step 412 is 0.07. In one embodiment, the lower threshold of step 416 for determining false positives is 0.4.

FIG. 17 is a flowchart describing in one embodiment of a process for calculating the oddness score for an IP address. That is, the process of FIG. 17 is one example implementation of step 410 of FIG. 16. The process of FIG. 17 is performed for one IP address across multiple visits in the same log file (or multiple log files). In one embodiment, each visit can receive a score and all the visit scores can be reported. In another embodiment, the visit scores are combined (e.g., averaged) to create a combined visit score.

In step 450 of FIG. 17, the system identifies the next visit in the log data. In step 415, the system accesses the next transaction in the current visit being operated on. In step 454, the system finds the corresponding transition in the Markov chain (representation of historical request sequence). That is, the transition in the log file is matched to a corresponding transition in the Markov chain discussed above that is from the same source state to the same destination state. That corresponding transition in the Markov chain has a set of probabilities, oddness scores and histograms precalculated, as discussed above. In step 456, the system determines the oddness of transition probability based on the corresponding transition in the Markov chain representation of historical request sequences (e.g., map the transition to the Markov chain). In one embodiment, the oddness of transition probabilities are precalculated. Therefore, just accessing the corresponding transition in the Markov chain will provide the access to the oddness of transition probability, as discussed above. In another embodiment, the oddness of transition probabilities are calculate during the proves of FIG. 17. In step 458, the system calculates the oddness of transition time for the transition based on the corresponding transition in the Markov chain representation of historical request sequences (i.e., map the transition to the Markov chain). That is the system will use the data in the Markov chain to calculate the oddness of transition time. More details will be provided below. In step 460, the system calculate the KL oddness for the transition based on the corresponding transition information in the Markov chain representation of historical request sequence. In step 462, the system combines the three oddness scores. In one example, the three oddness scores will be averaged. In other embodiments, other mathematical functions can be used to combine the oddness scores.

In step 464, the system determines whether there are any more transitions for the current visit for the current IP address. If so, the process loops back to step 452. If not, then at step 466, the system determines whether there are more visits for this current IP address being processed. If so, the process loops back to step 450 and the next visit is operated on. If there are no more visits for this IP address then in step 468 the system combines all the scores for all the visits. For example, each of the visit scores can be averaged to create an output score for the IP address. In other embodiments, other mathematical functions can also be used. In some embodiments, all the visit scores can be returned.

Figure 18:
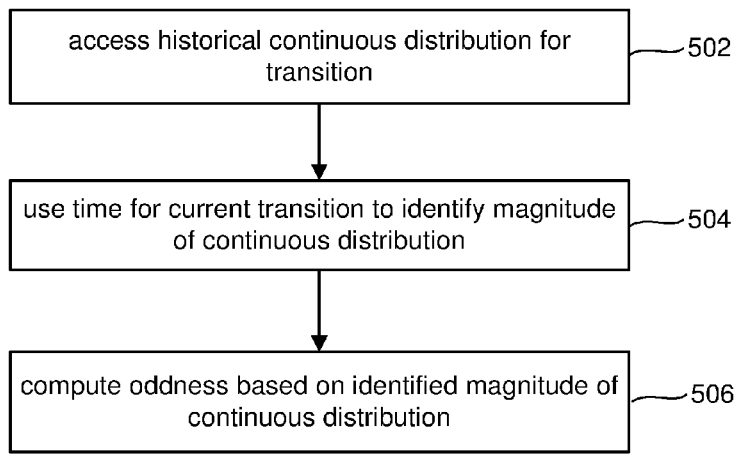
FIG. 18 is a flow chart describing one embodiment of a process for calculating oddness of transition time.

FIG. 18 is a flow chart describing one embodiment of a process for calculating oddness of transition time. That is, the process of FIG. 18 is one example implementation of step 458 of FIG. 17. In step 502 of FIG. 18, the system accesses the historical continuous distribution for transitions. That is, the system will access the distribution created in step 346 of FIG. 13. Remember that the process of FIG. 13 created a continuous distribution for each transition. Thus step 502 includes accessing the Markov chain to find the corresponding transition and then accessing the appropriate continuous distribution for that transition. In step 504, the system uses the time for making the request in the current transition to identify a magnitude on the continuous distribution. Looking back at FIG. 15, assume that the request took place at 6.8 seconds. The system will use the continuous distribution 380 to identify a magnitude of 0.13. The following equation is then used to determine oddness of transition time:

$$\text{Oddness of Transition Time} = 1 - \frac{\text{magnitude of continuous distribution at time}}{\text{magnitude of continuous distribution}}$$

The oddness is computed based on the identified magnitude in the continuous distribution as well as the maximum magnitude in step 506 using the equation above. Therefore, the oddness in transition time in this one example is calculated to be 1−0.13/0.37=0.65.

Figure 19:
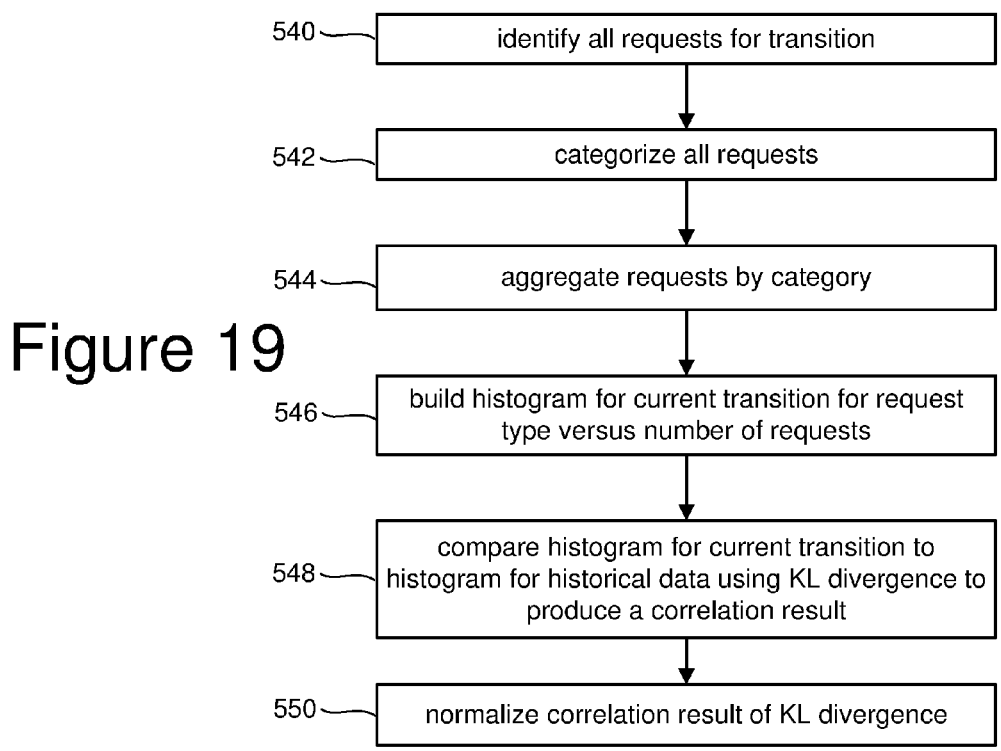
FIG. 19 is a flow chart describing one embodiment of a process for calculating KL oddness.

FIG. 19 is a flowchart describing one embodiment of a process for calculating KL oddness. That is, the process if FIG. 19 is one example implementation of step 460 of FIG. 17. In step 540 the system identifies all requests made for the transition. This is performed by looking at the entries in the log file. In step 542, all of the requests will be categorized by request type (e.g., images, java scripts, stylus sheets, etc.). In step 544, each of the requests will be aggregated by category. That is, for example, all the java script requests will be added up together to determine a number of java script requests. In step 546, the system builds a histogram for the current transition request type versus number of requests. Each bar will be a request type and the height of the bar will reflect the number of requests. In step 548, the histogram created step 546 will be compared against the histogram of the historical data using KL divergence to produce a correlation result. In step 550, the system will normalize the correlation result of the KL divergence. Steps 548 and 550 are implemented using the equations provided above for KL Oddness.

FIG. 20 is a flowchart describing one embodiment of a process performed by neural network analysis module 58. That is, FIG. 20 is a flowchart describing one embodiment of a process for detecting bots using deep learning and neural networks. Thus, the process of FIG. 20 is run in parallel to or otherwise in addition to the processes of FIGS. 3 and 12 in order to determine an additional or complimentary set of identification of bots. In step 602 of FIG. 20, the system define and train a neural network. In step 604, the system run new logs against the neural network to identify whether one or more requesters of network resources are from bots. The potential bots identified in step 604 will be reported to decision engine 62. The list of bots and/or botnets will eventually be used to send out alerts, block the bots for future accesses and/or redirect requests from bots to a different site.

The neural network is implemented as a classifier. For example, FIG. 21 shows classifier 630. In one embodiment, classifier 630 is implemented by neural network analysis module 58. Classifier 630 is a software module that receives an input log file. Classifier 630 includes a neural network used to determine whether, based on the input log file, the particular set of data in the image file indicates a bot or not a bot (e.g., output equals 1 if it is a bot and output equals 0 if not a bot). The classifier implements a neural network, as depicted in FIG. 22. In general, neural network will include an input layer of nodes and an output layer of nodes. In one embodiment, the output layer has two nodes. Between the input layer and output layer are a set of hidden layers. FIG. 22 shows two hidden layers. In other embodiments, more or less than two hidden layers can be used. Each of the nodes of each layer are represented as circles. Lines between the circles connecting different layers have weights and indicate the sending of data between layers. A neural network it is generally defined by five types of parameters: (1) the interconnection pattern between the different layers; (2) the learning process for updating the weights of the interconnection; (3) the activation function(s) that is/are performed at each of the nodes; (4) the loss function that maps an event or values of one or more variables onto a real number intuitively representing some "cost" associated with the event; and (5) an optimization algorithm seeks to minimize a loss function.

In one embodiment, all of the nodes of the neural network perform different activation functions. In another embodiment, all the nodes of a common hidden layer perform the same activation function. In other embodiments, all nodes perform the same activation function. In one embodiment, all nodes in the hidden layers are configured to perform the activation function referred to as "rectifier" in which f=max (0,x), which provides the output to be x (which is the input) if x>0 and provides the output to be 0 if x≤0, and the nodes in the output layer will use the softmax function. In machine-learned neural networks, the softmax function is often implemented at the final layer of a network used for classification. Such networks are then trained under a log loss (or cross-entropy) regime, giving a non-linear variant of multinomial logistic regression. The softmax function, or normalized exponential is a generalization of the logistic function that "squashes" a K-dimensional vector z of arbitrary real values to a K-dimensional vector σ(z) of real values in the range (0, 1) that add up to 1. The function is given by $$\sigma(z)_j = \frac{e^{z_j}}{\sum_{k=1}^{K} e^{z_k}} \text{ for } j = 1, \ldots, k$$

The loss function used is categorical cross entropy. And the optimization algorithm is Stochastic gradient descent with a learning rate of 0.01.

Figure 23:
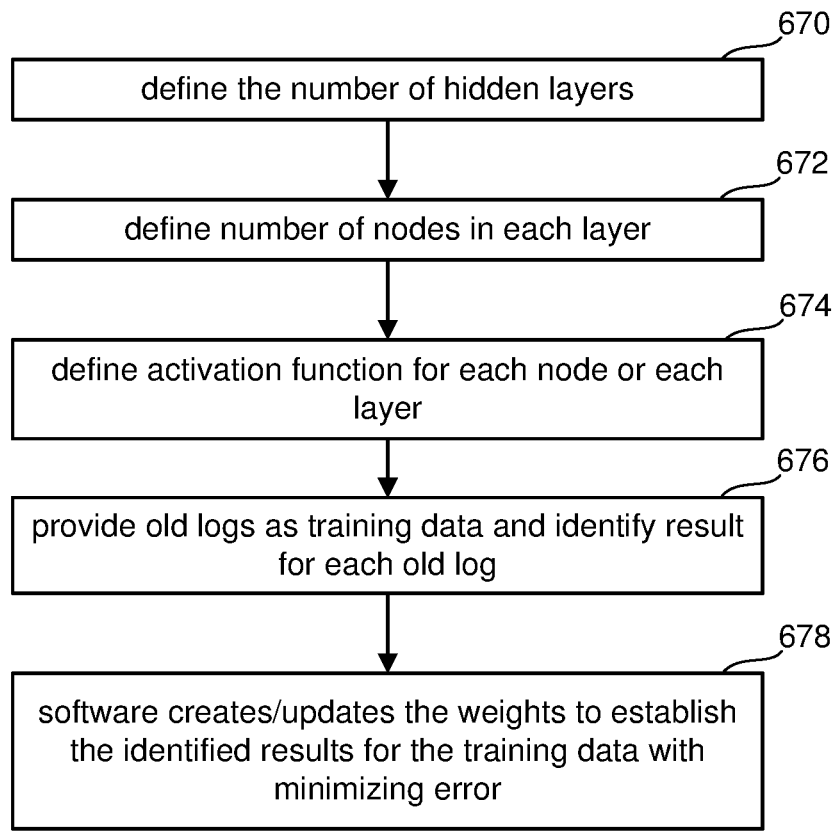
FIG. 23 is a flow chart describing one embodiment of a process for training a neural network.

FIG. 23 is a flowchart describing one embodiment of a process for training a neural network, such as the neural network of FIG. 22. The process of FIG. 23 is one example implementation of step 602 of FIG. 20, and represents the deep learning that is performed based on historical data found in old logs. In step 670 of FIG. 23, the number of hidden layers is defined. This can be performed by a human or a machine. In step 672, the number of nodes for each layer is defined, also by a human or a machine. In step 674, the activation function for each node is determined. Then loss function will be chosen. For example, Then optimization function will be chosen. In step 676, old logs are provided as training data. For each of the sets of training data, the system is also presented with the result from the old log. Based on this training data and the results, the neural network is updated by adjusting the weights of the interconnections between nodes in order to establish and identify results for the training data with minimizing the error (step 678). Step 678 is performed automatically by the software (e.g., module 58) based on the provided old logs.

After the model is trained, every time a new request comes in, the model will use the trained weights in it to compute the value of output layer (last layer). The output layer contains two value p and q. And p equals 1−q where 0<=p<=1. If p<0.5 then it is a request from a potential bot otherwise it is not.

Figure 24:
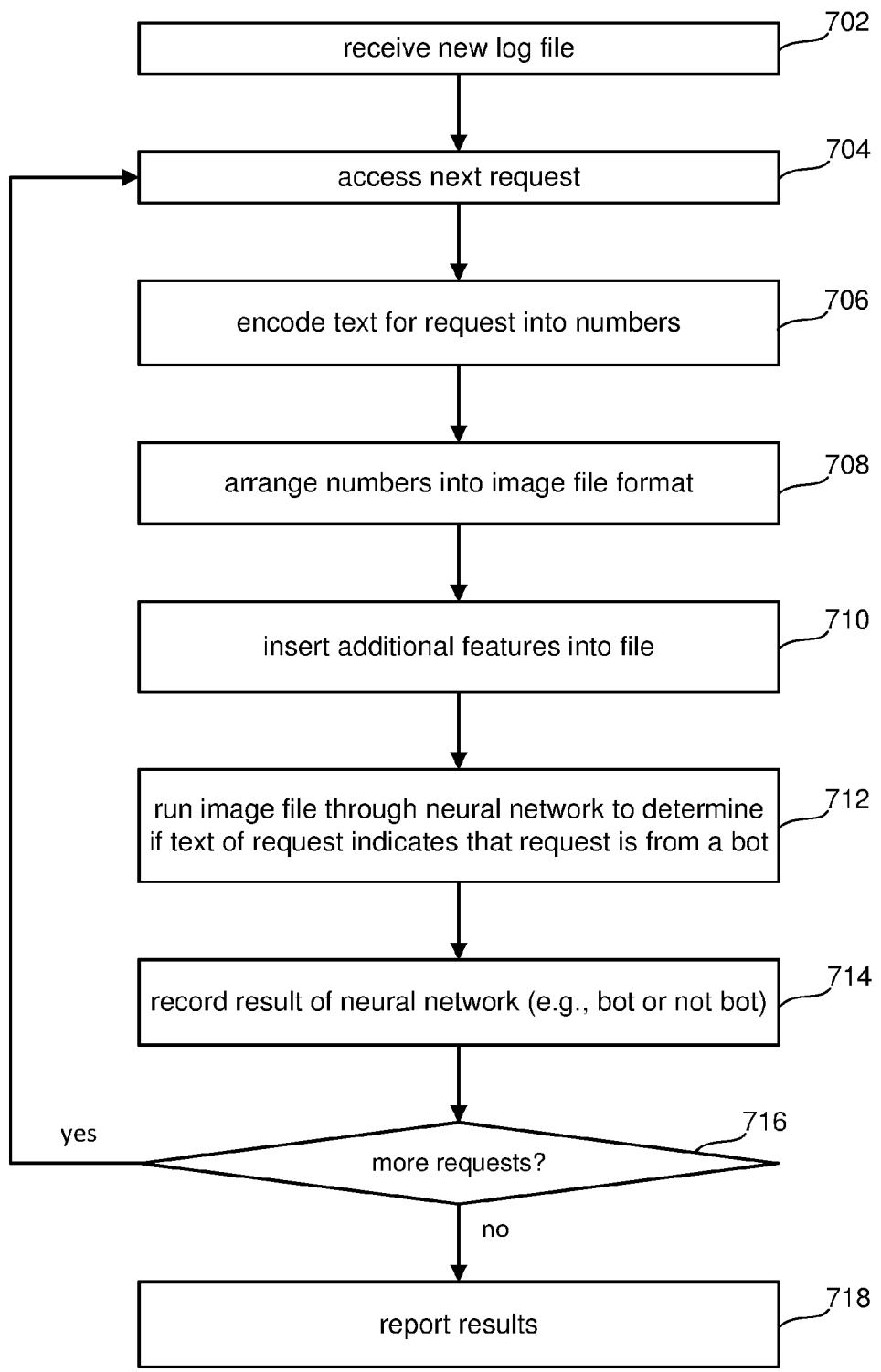
FIG. 24 is a flow chart describing one embodiment of a process for running new logs against a trained neural network to identify potential bots.

FIG. 24 is a flowchart describing one embodiment of a process for running new logs against the trained neural network to identify potential bots, if any. That is, the process of FIG. 24 is an example implementation of step 604 of FIG. 20. In step 702 of FIG. 24, a new log file is received. For example, the log file is received in real time by data analysis server 20 from application server 12 (FIG. 1). In step 704, the system (e.g., data analysis server 20) accesses the next request in the log file. This is the first time that step 704 is performed (i.e. as part of the loop of step 704-716) then the first request is accessed. In step 706, the text in the log file pertaining to the request is encoded into numbers. More detail will be explained below. In step 708, the numbers for the encoded text are arranged into an image file like format. That is, the numbers are put into a file in the similar format as an image. In step 710, additional features can be added into the file to be used as extra variables by the neural network. Examples of additional features can be the results from the other classifiers (modules 54, 56 and/or 60). The additional features can also include other sources of data, such as request counts, http verb used, request length, and other data. In step 712, the image like file is run through the neural network (FIGS. 21 and 22) to determine whether the text (that was encoded into numbers) and the other features of the request indicate that the request is from a bot. In step 714, the results of the neural network (e.g., bot or not bot)

are recorded. If there are more requests to consider (step 716), then the process loops back to step 704 and accesses the next request for processing via the loop of steps 704-716. If there are no more requests left to be processed (step 716) then the results are reported in step 718. For example, a list of potential bots are reported to decision engine 16 which may be then used to block, redirect or otherwise deal with the bots. Note that steps 702-710 of FIG. 24 can be used to implement step 676 of FIG. 23.

Figures 25, 26:
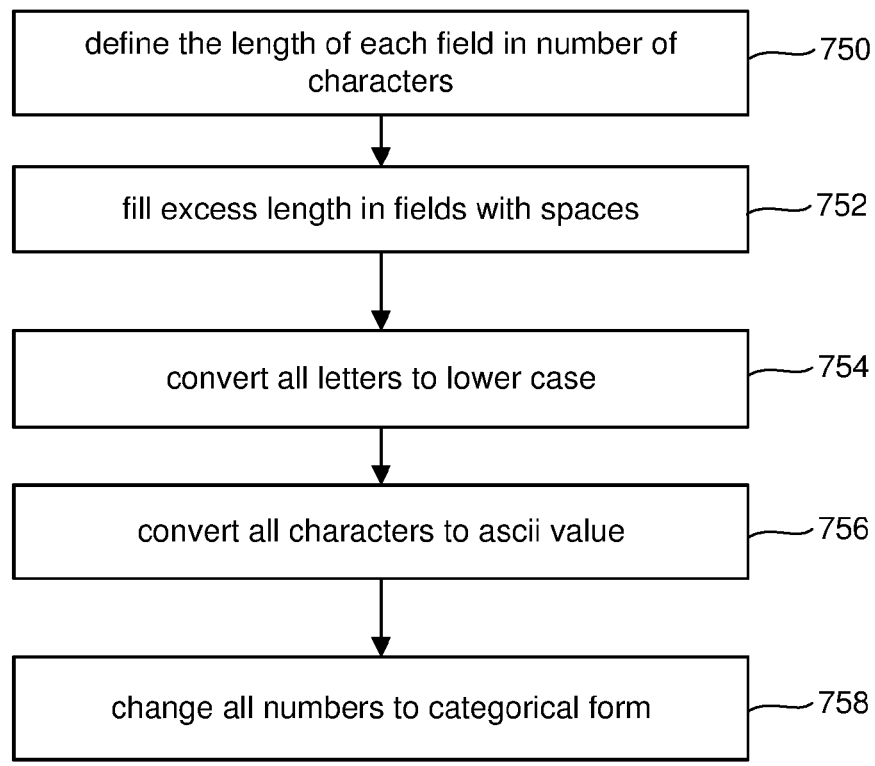
FIG. 25 is a flow chart describing one embodiment of a process for encoding text into numbers.
FIG. 26 depicts a raw input string of text.

FIG. 25 is a flowchart describing one embodiment of a process for encoding text for a request into numbers. The process of FIG. 25 is one example implementation of step 706 of FIG. 24. In step 750, the system defines the length of each field in terms of number of characters. In one embodiment, step 750 is performed in advance. In other embodiments, step 750 is performed at the same time as step 752-758 in order to dynamically determine the number of characters. In step 752, the system accesses the data for each request and looks at the different fields within the requests. If any of the data for the fields are less than the amount of characters allocated for the length of that field, then the excess room in the field is filled with blank spaces.

FIG. 26 shows the raw input string of one request that may appear in a log from an Apache server. This example content, which can be used for any of the modules 54-60 described above, includes the requester's IP address, time stamp, the HTTP command, target URL, and browser identification. Log file entries may also include length of reply, status code and other information.

FIG. 27 shows that input string after the fields have been filled with blank spaces during step 752.

In step 754, all letters are converted to lowercase. The results of step 754 is depicted in FIG. 28, which all letters are lowercase. In step 756, all characters are converted to their ASCII value. FIG. 29 shows a portion of the request with each character converted to ASCII value. Note that the ASCII value 32 represents blank space. Note that ASCII codes are numbers between 0 and 127. In step 758, all ASCII numbers are changed to categorical form. In FIG. 29, the ASCII value is represented as integers between 0 and 127. In step 758, east integer representing the ASCII value is converted to a categorical form such as a 128 bit base 2 number, with all the bits being logic 0 except one bit being at logic 1. Thus, for a blank space, where the ASCII value is 32, bit 32 (of bits 0-127) is set to logic 1 and every other bit is at logic 0. Due to the function performed during step 758, every character has now been converted from text to categorical form as base 2 digits occupying a constant number of bits (128 bits). FIG. 30 depicts a portion of the request after converting the numbers to categorical form.

The above-described bot detection technologies allow a computing system to automatically detect both bots and botnets. Once bots and botnets are detected, the system can report the list of bots and botnets to an entity who can act on that information or the system can automatically act to prevent the bots and botnets from causing further harm. For example, the system can block the bots and bot nest from accessing network resources (e.g., the resources associated with the URLs in the logs) or otherwise prevent access to the network resources for the bots. The system can reject or redirect requests for the network resources. By doing so, the computing system will run better as it will no longer be diverting resources for responding to bots. Additionally, website statistics will not be skewed, spam can be reduced, attacks can be avoided and servers will not go down due to bots.

All of the flow charts discussed above can be performed automatically, meaning that they can be performed by a machine rather than by a human.

One embodiment includes a method to detect bots, comprising: constructing a representation of historical request sequences that includes network resources, transitions between network resources and criteria for multiple scores for each transition related to performance of the transition; for a new visit to a network resource comprising a new transition, evaluating criteria for multiple scores for the new transitions based on the representation of historical request sequences to compute a visit score for the new visit; and determining if the new visit is from a bot based on the visit score.

One embodiment includes an apparatus, comprising: a communication interface; a storage medium; and a processor connected to the storage medium and the communication interface. The processor is configured to access log data for a visit. The visit comprises a particular transition. The processor is configured to find a corresponding transition in a representation of historical request sequences of visits and determine a first oddness score for the particular transition based on first oddness criteria for the corresponding transition in the representation of historical request sequences of visits. The processor is configured to determine a second oddness score for the particular transition based on second oddness criteria for the corresponding transition in the representation of historical request sequences of visits and combine the first oddness score with the second oddness score to create a combined score. Based on the combined score the processor is configured to determine whether an entity performing the visit is a bot.

One embodiment includes a computer program product comprising a computer readable storage medium having computer readable program code embodied therewith. The computer readable program code comprising: computer readable program code configured to construct a Markov chain representation of historical request sequences that includes oddness score criteria for transitions; computer readable program code configured to map a new request to the Markov chain representation, calculate multiple oddness scores for a transition of the new request and combine the multiple oddness scores to create a combined score; and computer readable program code configured to determine if the new request is from a bot based on comparing the combined score to a threshold.

One embodiment includes a method for detecting bots, comprising: encoding network request data from text to numbers, the network request data includes requester information and network targets; and running encoded network request data as numbers though a neural network to identify whether a requester as a bot.

One embodiment includes as apparatus, comprising: a communication interface; a storage medium; and a processor connected to the storage medium and the communication interface. The processor is configured to implement a neural network that comprises multiple layers of nodes having activation functions. The processor is configured to access log text comprising IP addresses and URLs and convert the log text to numbers. The processor is configured to run the converted log text as numbers on the neural network to identify a subset of IP addresses as bots.

One embodiment includes a computer program product comprising: a computer readable storage medium having computer readable program code embodied therewith. The computer readable program code comprising: computer readable program code configured to define a neural network and train the neural network using training logs; and computer readable program code configured to run new logs against the neural network to identify potential bots by encoding network request data of new logs from text to numbers and running encoded network request data from the new logs as numbers though the neural network to identify a requester as a bot.

One embodiment includes a method for detecting bots, comprising: identifying a subset of time windows in data that comprises a plurality of request URLs and associated IP addresses by comparing differences in distributions of URLs in time windows as compared to a historical distribution of URLs and identifying time windows with divergences greater than a threshold; and identifying a subset of IP addresses in the identified subset of time windows as bots based on analyzing variance of data.

In some example implementations, the comparing differences in distributions of URLs in time windows as compared to the historical distribution of URLs comprises performing a variant of Kullback-Leibler divergence.

In some example implementations, the identifying a subset of IP addresses comprises further identifying a reduced set of time windows from the subset of time windows by performing principal component analysis on the subset of time windows and performing clustering of IP addresses from the reduced set of time windows.

In some example implementations of any of the above-described embodiments, in response to the identifying the bots, the system prevents the bots from accessing network resources.

One embodiment includes an apparatus, comprising: a communication interface; a storage medium; and a processor connected to the storage medium and the communication interface. The processor is configured to determine suspicious time windows in a plurality of networks requests based on Kullback-Leibler divergence and identify a subset of requesters of network requests in determined suspicious time windows as bots using principal component analysis.

One embodiment includes a computer program product comprising a computer readable storage medium having computer readable program code embodied therewith. The computer readable program code comprising: computer readable program code configured to access a log file that includes request URLs and associated source IP addresses; computer readable program code configured to group request URLs and associated source IP addresses into time windows; computer readable program code configured to determine suspicious time windows using a variant of Kullback-Leibler divergence; computer readable program code configured to identify a subset of IP addresses in determined suspicious time windows as bots using principal component analysis and clustering; and computer readable program code configured to report the IP addresses identified as bots.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. A computer readable storage medium (e.g., storage 24 of FIG. 1) may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code which programs a processor for carrying out operations for aspects of the present disclosure may be written in any combination of one or more programming languages, including an object oriented programming language such as Java, Scala, Smalltalk, Eiffel, JADE, Emerald, C++, CII, VB.NET, Python or the like, conventional procedural programming languages, such as the "c" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams described above, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, processor, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

For purposes of this document, it should be noted that the dimensions of the various features depicted in the figures may not necessarily be drawn to scale.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more others parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The corresponding structures, materials, acts, and equivalents of any means or step plus function elements in the claims below are intended to include any disclosed structure, material, or act for performing the function in combination with other claimed elements as specifically claimed.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A process for detecting bots, comprising:
   receiving at an analysis server a log file generated by an application server that documents interaction with clients;
   the analysis server constructing a representation of historical request sequences from the log file such that the representation includes identifications of network resources, identifications of transitions between the network resources, identifications of probabilities of the transitions occurring and criteria for multiple scores for each transition related to performance of the transition;
   for a new visit to a network resource comprising a new transition, evaluating criteria for multiple scores for the new transitions based on the representation of historical request sequences to compute a visit score for the new visit;
   determining that the new visit is from a bot based on the visit score; and
   the application server blocking the bot from further access to the network resources in response to the determining.

2. The process of claim 1, wherein:
   the criteria for multiple scores for each transition related to performance of the transition comprise: oddness for performing each transition, data representing transition times for each transition and historical data of request types versus number of request for each request type for each transition.

3. The process of claim 1, wherein:
   the constructing of the representation of historical request sequences comprises constructing a Markov chain based behavior model, creating a first histogram of time versus quantity of requests for a given transition based on the Markov chain based behavior model, and creating a second histogram of number of requests for different resources based on the Markov chain based behavior model; and
   the evaluating criteria includes using the first histogram and the second histogram to create one or more oddness values that reflect how strange a visit is.

4. The process of claim 1, wherein the constructing the representation of historical request sequences comprises:
   constructing a Markov chain based behavior model; and
   computing oddness of transition probability, comprising:
   determining a probability of each transition for a set of transitions from a first page to a set of next pages and computing oddness of each transition as 1−(probability of transition/max probability of all transitions from the first page).

5. The process of claim 1, wherein the constructing the representation of historical request sequences comprises:
constructing a Markov chain based behavior model that includes the network resources and the transitions between network resources;
computing oddness of transition probability for each transition;
creating a histogram of historical transition times for each transition;
computing continuous distributions for the histograms; and
creating a histogram of historical data of request type versus number of requests for each transition;
the oddness of each transition, continuous distributions and the histograms of historical data of request type versus number of requests are the criteria for multiple scores.

6. The process of claim 1, wherein:
the evaluating criteria, determining and blocking are performed by the analysis server; and
the blocking includes the application server ignoring a request by the bot in response to an instruction from the analysis server.

7. The process of claim 1, further comprising:
determining and reporting that an IP address associated with the visit is a false positive based on the visit score.

8. The process of claim 1, further comprising:
determining that the visit score satisfies a false positive threshold;
adding an indication of the IP address associated with the visit to a data structure of false positives; and
removing the IP address associated with the visit from a reporting of bots.

9. The process of claim 1, wherein the evaluating criteria for multiple scores for the new transition based on the representation of historical request sequences to compute the visit score for the new visit comprises:
accessing content for the visit from a log file;
identifying the new transition in the content;
finding a corresponding transition in the representation of historical request sequences;
determining a first oddness score for the new transition based on first oddness criteria for the corresponding transition in the representation of historical request sequences;
determining a second oddness score for the new transition based on second oddness criteria for the corresponding transition in the representation of historical request sequences of visits;
determining a third oddness score for the new transition based on third oddness criteria for the corresponding transition in the representation of historical request sequences of visits; and
combining the first oddness score with the second oddness score and the third oddness score to create a combined score.

10. The process of claim 9, wherein:
the first oddness score is oddness of transition probability;
the second oddness score is oddness of transition time; and
the third oddness score is oddness of number of requests per request type.

11. The process of claim 10, wherein:
the determining the first oddness score comprises calculating 1−(probability of transition/max probability of all transitions from the first page).

12. The process of claim 10, wherein:
the determining the second oddness score comprises calculating 1−(likelihood of timing of actual request/max likelihood of timing).

13. The process of claim 10, wherein:
the determining the third oddness score comprises calculating a Kullback-Leibler divergence between histogram of types of requests for new transition and histogram of types of requests for historical transitions.

14. The process of claim 10, wherein the determining the third oddness score comprises:
identifying all requests for the new transition;
categorizing all of the requests for the new transition;
aggregating the requests by category;
building a new histogram for the new transition for request type versus number of requests;
comparing the new histogram to a histogram for historical data using KL Divergence to produce a correlation result; and
normalizing the correlation result.

15. The process of claim 1, wherein the evaluating criteria for multiple scores for the new transitions based on the representation of historical request sequences to compute the visit score for the new visit comprises:
accessing content for the visit from a log file;
identifying multiple transitions in the content;
for each transition, determining multiple oddness scores and combining the scores into combined transition scores; and
combining the combined transition scores into the visit score.

16. An apparatus, comprising:
a communication interface;
a storage medium; and
a processor connected to the storage medium and the communication interface, the processor is configured to access log data for a visit, the visit comprises a particular transition, the processor is configured to find a corresponding transition in a representation of historical request sequences of visits and determine a first oddness score for the particular transition based on first oddness criteria for the corresponding transition in the representation of historical request sequences of visits, the processor is configured to determine a second oddness score for the particular transition based on second oddness criteria for the corresponding transition in the representation of historical request sequences of visits and combine the first oddness score with the second oddness score to create a combined score, based on the combined score the processor is configured to determine whether an entity performing the visit is a bot.

17. The apparatus of claim 16, wherein:
the first oddness score is oddness of transition probability; and
the second oddness score is oddness of transition time.

18. The apparatus of claim 16, wherein:
the log data is for a set of network resources; and
the processor is configured to block the entity performing the visit from further visiting the network resources in response to determining that the entity performing the visit is a bot.

19. The apparatus of claim 16, wherein:
the processor is configured to construct the representation of historical request sequences of visits that includes criteria for multiple oddness scores for each transition.

20. A computer program product comprising:
a non-transitory computer readable storage medium having computer readable program code embodied therewith, the computer readable program code configured for programming a processors to perform a method comprising:
constructing a Markov chain representation of historical request sequences that includes identifications of resources, identifications of transitions between the resources, identifications of probabilities of the transitions occurring and oddness score criteria for the transitions;
mapping a new request to the Markov chain representation, calculating multiple oddness scores for a transition of the new request based on the Markov chain representation and combining the multiple oddness scores to create a combined score; and
determining if the new request is from a bot based on comparing the combined score to a threshold.

* * * * *